United States Patent
Chavez et al.

(10) Patent No.: US 10,974,851 B2
(45) Date of Patent: Apr. 13, 2021

(54) SYSTEM AND METHOD FOR MAINTAINING AND CONFIGURING ROTORCRAFT

(71) Applicant: Textron Innovations Inc., Providence, RI (US)

(72) Inventors: Jeremy Robert Chavez, Colleyville, TX (US); Peter Shultz, Hurst, TX (US); Thomas Kurt Schneider, Flower Mound, TX (US); Mark Howard Thomson, Arlington, TX (US); Daniel Wesley Rowe, Mansfield, TX (US)

(73) Assignee: Textron Innovations Inc., Providence, RI (US)

( * ) Notice: Subject to any disclaimer, the term of this patent is extended or adjusted under 35 U.S.C. 154(b) by 166 days.

(21) Appl. No.: 16/186,158

(22) Filed: Nov. 9, 2018

(65) Prior Publication Data

US 2020/0148393 A1 May 14, 2020

(51) Int. Cl.
*B64F 5/60* (2017.01)
*B64C 27/22* (2006.01)
(Continued)

(52) U.S. Cl.
CPC .............. *B64F 5/60* (2017.01); *B64C 27/22* (2013.01); *B64D 45/00* (2013.01); *G07C 5/085* (2013.01);
(Continued)

(58) Field of Classification Search
CPC ........... B64F 5/60; B64C 27/22; B64D 45/00; B64D 2045/0085; G07C 5/0808; G07C 5/0816; G07C 5/085; G06Q 10/06
See application file for complete search history.

(56) References Cited

U.S. PATENT DOCUMENTS 5,210,704 A 5/1993 Husseiny
5,493,679 A 2/1996 Virgil et al.
(Continued)

FOREIGN PATENT DOCUMENTS

CN 103010485 A 4/2013
CN 105631639 A 6/2016
(Continued)

OTHER PUBLICATIONS

"Big Data Takes Off But Flight is Just Beginning," Aviation Maintenance (avm-mag.com) Jul. 25, 2017, https://www.avm-mag.com/big-data-takes-off-flight-just-beginning/, downloaded Dec. 26, 2017, 6 pages.
(Continued)

*Primary Examiner* — Rodney A Butler
(74) *Attorney, Agent, or Firm* — Slater Matsil, LLP

(57) ABSTRACT

In an embodiment, a method includes: collecting usage and maintenance data for a rotorcraft at a computer of the rotorcraft; sending the usage and maintenance data to a fleet management server; generating individualized equipment data for the rotorcraft according to the usage and maintenance data at the fleet management server, the individualized equipment data including a lightweight digital representation of the rotorcraft and technical publications for the rotorcraft, the lightweight digital representation including mesh-based 3D visualizations of each component of the rotorcraft, the technical publications having views referencing the mesh-based 3D visualizations; sending the individualized equipment data to the computer of the rotorcraft; and persisting the individualized equipment data at the computer of the rotorcraft.

20 Claims, 25 Drawing Sheets

(51) Int. Cl.
B64D 45/00 (2006.01)
G07C 5/08 (2006.01)

(52) U.S. Cl.
CPC ......... *G07C 5/0808* (2013.01); *G07C 5/0816* (2013.01); *B64D 2045/0085* (2013.01)

(56) References Cited

U.S. PATENT DOCUMENTS

| | | |
|---|---|---|
| 5,881,971 A | 3/1999 | Hickman |
| 6,189,836 B1 | 2/2001 | Gold et al. |
| 6,487,479 B1 | 11/2002 | Nelson |
| 6,725,184 B1 | 4/2004 | Gadh et al. |
| 6,735,549 B2 | 5/2004 | Ridolfo |
| 6,826,500 B2 | 11/2004 | Linthicum et al. |
| 7,054,706 B2 | 5/2006 | Kempf et al. |
| 7,225,981 B2 | 6/2007 | Jongebloed |
| 7,243,042 B2 | 7/2007 | Plotts et al. |
| 7,286,898 B2 | 10/2007 | Parmenter et al. |
| 7,438,259 B1 | 10/2008 | Piasecki et al. |
| 7,467,161 B2 | 12/2008 | Frisina |
| 7,551,086 B2 | 6/2009 | Coop et al. |
| 7,603,191 B2 | 10/2009 | Gross |
| 7,707,487 B2 | 4/2010 | Easter et al. |
| 7,761,201 B2 | 7/2010 | Avery et al. |
| 7,778,794 B2 | 8/2010 | Davies et al. |
| 7,860,618 B2 | 12/2010 | Brandstetter et al. |
| 7,931,197 B2 | 4/2011 | Brandt et al. |
| 7,983,809 B2 | 7/2011 | Kell et al. |
| 7,984,146 B2 | 7/2011 | Rozak et al. |
| 8,019,504 B2 | 9/2011 | Jamrosz et al. |
| 8,195,535 B2 | 6/2012 | Nagalla et al. |
| 8,229,791 B2 | 7/2012 | Bradley et al. |
| 8,255,096 B2 | 8/2012 | Wildschek et al. |
| 8,266,066 B1 | 9/2012 | Wezter et al. |
| 8,396,571 B2 | 3/2013 | Costiner et al. |
| 8,478,477 B2 | 7/2013 | Maisonneuve et al. |
| 8,487,785 B2 | 7/2013 | Fournier et al. |
| 8,509,990 B2 | 8/2013 | Bennett et al. |
| 8,548,879 B2 | 10/2013 | Shiner et al. |
| 8,655,698 B2 | 2/2014 | West, II et al. |
| 8,694,196 B1 | 4/2014 | Doulatshahi et al. |
| 8,739,059 B2 | 5/2014 | Rabenold et al. |
| 8,768,141 B2 | 7/2014 | Chan |
| 8,798,848 B2 | 8/2014 | Gu et al. |
| 8,812,284 B2 | 8/2014 | Damiani et al. |
| 8,818,696 B2 | 8/2014 | Klooster et al. |
| 8,825,276 B2 | 9/2014 | Lake et al. |
| 8,868,284 B2 | 10/2014 | Isom et al. |
| 8,868,287 B2 | 10/2014 | Delaye et al. |
| 8,880,242 B2 | 11/2014 | Hinnant, Jr. et al. |
| 9,020,689 B2 | 4/2015 | Smith et al. |
| 9,081,917 B2 | 7/2015 | Currin et al. |
| 9,082,208 B2 | 7/2015 | Gabel et al. |
| 9,096,328 B2 | 8/2015 | Pitard et al. |
| 9,102,399 B2 | 8/2015 | Sahasrabudhe et al. |
| 9,141,266 B2 | 9/2015 | McCormick et al. |
| 9,165,414 B2 | 10/2015 | Karnik et al. |
| 9,196,165 B2 | 11/2015 | La Civita et al. |
| 9,218,694 B1 | 12/2015 | Kipersztok et al. |
| 9,242,723 B2 | 1/2016 | Wildschek |
| 9,251,502 B2 | 2/2016 | Schoonveld |
| 9,257,048 B1 | 2/2016 | Offer et al. |
| 9,321,542 B2 | 4/2016 | Dunsdon |
| 9,327,846 B2 | 5/2016 | Lake et al. |
| 9,448,558 B2 | 9/2016 | Litwinowicz et al. |
| 9,448,758 B2 | 9/2016 | Georgeson et al. |
| 9,520,066 B2 | 12/2016 | Spinelli et al. |
| 9,552,567 B2 | 1/2017 | Iyer et al. |
| 9,558,450 B2 | 1/2017 | Kamenka et al. |
| 9,618,459 B2 | 4/2017 | Maass |
| 9,620,023 B2 | 4/2017 | Magana |
| 9,671,777 B1 | 6/2017 | Aichele et al. |
| 9,683,454 B1 | 6/2017 | Welch et al. |
| 9,716,595 B1 | 7/2017 | Kravitz et al. |
| 9,740,554 B2 | 8/2017 | Swayne et al. |
| 9,774,578 B1 | 9/2017 | Ateniese et al. |
| 9,791,352 B2 | 10/2017 | Patrick et al. |
| 9,818,088 B2 | 11/2017 | Penilla et al. |
| 9,830,603 B2 | 11/2017 | Vasters |
| 2003/0187878 A1 | 10/2003 | Sandifer |
| 2004/0225474 A1 | 11/2004 | Goldfine et al. |
| 2004/0260594 A1 | 12/2004 | Maddox, Jr. |
| 2006/0155432 A1 | 7/2006 | Brown |
| 2006/0184825 A1 | 8/2006 | Regan |
| 2007/0118502 A1 | 5/2007 | Aragones et al. |
| 2007/0294052 A1 | 12/2007 | Stathis et al. |
| 2008/0071412 A1 | 5/2008 | Suzuki et al. |
| 2008/0234994 A1 | 9/2008 | Goebel et al. |
| 2009/0150022 A1 | 6/2009 | McMillin et al. |
| 2010/0179844 A1 | 7/2010 | LaFergola et al. |
| 2012/0283963 A1 | 11/2012 | Mitchell et al. |
| 2012/0310449 A1* | 12/2012 | Hinnant, Jr. ............ B64C 13/16 701/3 |
| 2013/0067017 A1 | 3/2013 | Carriere et al. |
| 2013/0338974 A1 | 12/2013 | Kochman et al. |
| 2014/0310702 A1 | 10/2014 | Ricci et al. |
| 2014/0344181 A1 | 11/2014 | Brown |
| 2014/0350989 A1 | 11/2014 | Telatar et al. |
| 2015/0051786 A1 | 2/2015 | Wang |
| 2015/0185716 A1 | 7/2015 | Wichmann et al. |
| 2015/0227659 A1 | 8/2015 | Andersson et al. |
| 2015/0234951 A1 | 8/2015 | Andersson et al. |
| 2015/0254382 A1 | 9/2015 | Bolander et al. |
| 2015/0279218 A1 | 10/2015 | Irrgang et al. |
| 2015/0310360 A1 | 10/2015 | Currin et al. |
| 2015/0324489 A1 | 11/2015 | Onodera |
| 2015/0339453 A1 | 11/2015 | Richards et al. |
| 2016/0036513 A1* | 2/2016 | Klippert ............ H04L 41/5058 455/15 |
| 2016/0041552 A1 | 2/2016 | Dagnino et al. |
| 2016/0110820 A1 | 4/2016 | Fleck et al. |
| 2016/0188675 A1 | 6/2016 | Vossler |
| 2016/0247129 A1 | 8/2016 | Song et al. |
| 2016/0281607 A1 | 9/2016 | Asati et al. |
| 2016/0321530 A1 | 11/2016 | Troy et al. |
| 2016/0324940 A1 | 11/2016 | DeRosa et al. |
| 2016/0328883 A1 | 11/2016 | Parfenov et al. |
| 2016/0333854 A1 | 11/2016 | Lund et al. |
| 2016/0333855 A1 | 11/2016 | Lund et al. |
| 2016/0339652 A1 | 11/2016 | Safai et al. |
| 2016/0342930 A1 | 11/2016 | Tucker et al. |
| 2016/0349723 A1 | 12/2016 | Patel et al. |
| 2017/0032281 A1 | 2/2017 | Hsu |
| 2017/0054954 A1 | 2/2017 | Keitler et al. |
| 2017/0091791 A1 | 3/2017 | Srinivasan et al. |
| 2017/0097647 A1 | 4/2017 | Lunani et al. |
| 2017/0109712 A1 | 4/2017 | Bullock |
| 2017/0113422 A1 | 4/2017 | Maass |
| 2017/0129254 A1 | 5/2017 | Nardiello et al. |
| 2017/0132938 A1 | 5/2017 | Lax et al. |
| 2017/0151965 A1 | 6/2017 | Brooks et al. |
| 2017/0192414 A1 | 7/2017 | Mukkamala et al. |
| 2017/0286572 A1 | 10/2017 | Hershey et al. |
| 2017/0291715 A1 | 10/2017 | Jayathirtha et al. |
| 2017/0293705 A1 | 10/2017 | Van der Velden et al. |
| 2017/0295057 A1 | 10/2017 | Dost et al. |
| 2017/0302649 A1 | 10/2017 | Singh et al. |
| 2017/0323231 A1 | 11/2017 | Johnson et al. |
| 2017/0323239 A1 | 11/2017 | Johnson et al. |
| 2017/0323240 A1 | 11/2017 | Johnson et al. |
| 2017/0323403 A1 | 11/2017 | Johnson et al. |
| 2018/0227277 A1 | 8/2018 | Fischer et al. |

FOREIGN PATENT DOCUMENTS

| | | |
|---|---|---|
| CN | 103136791 B | 11/2016 |
| EP | 0239066 A1 | 9/1987 |
| WO | 2017045789 A1 | 3/2017 |

OTHER PUBLICATIONS

Blechschmidt, B., "Digital Twin on Blockchain Enabling the circular economy," Jun. 2017, Cognizant, http://blockchaincompetence.

(56) References Cited

OTHER PUBLICATIONS com/wp-content/uploads/2017/06/Digital-Twin-on-Blockchain-DISTRIBUTE.pdf, downloaded Dec. 26, 2017, 15 pages.
"Here's how virtual models are projecting the future" Business Insider UK, Jul. 11, 2016, http://www.businessinsider.com/sc/digital-twins-are-changing-industry, downloaded Dec. 26, 2017, 3 pages.
Byington, C. et al. "Prognostic Enhancements to Diagnostic Systems for Improved Condition-Based Maintenance," Aerospace Conference Proceedings, 2002, IEEE. vol. 6. IEEE, 2002, 12 pages.
Calise, A. et al., "Adaptive Model Inversion Flight Control for Tilt-Rotor Aircraft," Presented at the AIAA Guidance, Navigation and Control Conference, Paper No. 97-3758, Aug. 1997, 7 pages.
Cerrone, A., et al., "On the Effects of Modeling As-Manufactured Geometry: Toward Digital Twin," International Journal of Aerospace Engineering, vol. 2014, Article ID 439278, Aug. 27, 2014, 10 pages.
Coppinger, R., "Products are Set to Live Twice: Once in Real Life, Once in Digital Form," Engineering and Technology, Nov. 9, 2016, https://eandt.theiet.org/content/articles/2016/11/digital-twins-cad-design-through-the-looking-glass/, downloaded Dec. 26, 2017, 4 pages.
Custeau, K., "The Digital Twin: Foundation for Fleet Socialization to Optimize Operations," Schneider Electric, Mar. 31, 2017, https://blog.schneider-electric.com/industrial-software/2017/03/31/digital-twin-foundation-fleet-socialization-optimize-operations/, downloaded Dec. 26, 2017, 5 pages.
Daily, J., et al., "(2017) Predictive Maintenance: How Big Data Analysis Can Improve Maintenance," (Abstract only), Supply Chain Integration Challenges in Commercial Aerospace, Springer International Publishing, Switzerland, Dec. 14, 2016, 2 pages.
Datta, S. "Emergence of Digital Twins," MIT Auto-ID Labs, Massachusetts Institute of Technology, arXiv preprint arXiv:1610.06467 (2016), 13 pages.
Davidson, J. et al., "Real-Time Adaptive Control Allocation applied to a High Performance Aircraft," 2001 5th SIAM Conference on Control & Its Applications, Jul. 11-14, 2001, 11 pages.
Fuller, T., et al., "IoT Applications in an Adaptive Intelligent System with Responsive Anomaly Detection," Future Technologies Conference (FTC); IEEE, Dec. 6-7, 2016, San Francisco, pp. 754-762.
"Digital Twin at Work: The Technology That's Changing Industry," (2017) GE Digital, https://www.ge.com/digital/blog/digital-twin-work-technology-changing-industry#, downloaded Dec. 26, 2017, 6 pages.
"The Digital Twin: Compressing Time to Value for Digital Industrial Companies," GE White Paper; https://www.ge.com/digital/sites/default/files/The-Digital-Twin_Compressing-Time-to-Value-for-Digital-Industrial-Companies.pdf, 2016, 10 pages.
Glaessgen, E. H., et al., "The Digital Twin Paradigm for Future NASA and U.S. Air Force Vehicles," 53rd Structural Dynamics, and Materials Conference: Special Session on Digital Twin, American Inst. of Aeronautics and Astronautics, Honolulu, HI, 2012, 14 pages.
Grieves, M. et al., "Digital Twin: Mitigating Unpredictable, Undesirable Emergent Behavior in Complex Systems (Excerpt)," Transdisciplinary Perspectives on Complex Systems, Springer International Publishing, 85-113, https://link.springer.com/chapter/10.1007/978-3-319-38756-7_4, Aug. 17, 2016, 7 pages.
Gutierrez, C. et al., "Digital Twins for Aerospace: Better Fleet Reliability and Performance," Altoros, Aug. 3, 2017, 11 pages.
Heber, D. et al., "Towards a Digital Twin: How the Blockchain Can Foster E/E-Traceability in Consideration of Model-Based Systems Engineering," DS 87-3 Proceedings of the 21st International Conference on Engineering Design (ICED 17), vol. 3: Product, Services and Systems Design, Vancouver, Canada, Aug. 21-25, 2017, 10 pages.
Kraft, J. et al., "Engine Fleet-Management: The Use of Digital Twins From a MRO Perspective," ASME Turbo Expo 2017: Turbomachinery Technical Conference and Exposition, American Society of Mechanical Engineers, http://proceedings.asmedigitalcollection.asme.org/proceeding.aspx?articleid=2649476, Jun. 26-30, 2017, 3 pages.
Lee, J. et al., "Predictive Manufacturing System—Trends of Next-Generation Production Systems," 11th IFAC Workshop on Intelligent Manufacturing Systems, May 22-24, 2013, Sao Paulo, Brazil, pp. 150-156.
Lee, J., et al., "Recent advances and trends in predictive manufacturing systems in big data environment," Manufacturing Letters 1 (2013), Society of Manufacturing Engineers (SME), Elsevier Ltd., Oct. 3, 2013, pp. 38-41.
Miller, L. et al., "Rotorcraft Health and Usage Monitoring Systems—A Literature Survey," Report No. DOT/FAA/RD-91-6, Systems Control Technolgy, Inc., May 1991, 72 pages.
"Digital Twin," Mitek Analytics LLC, mitekan.com, http://www.mitekan.com/index.php/services-top-menu/performance-dt-top-menu-item, downloaded Dec. 26, 2017, 3 pages.
"Digital 'Clone' Testing Aims to Maximize Machine Efficiency," NASA, https://www.nasa.gov/offices/oct/feature/digital-clone-testing-aims-to-maximize-machine-efficiency, May 12, 2016, 5 pages.
"Digital Twins for IoT Applications: A Comprehensive Approach to Implementing IoT Digital Twins," Oracle White Paper, http://www.oracle.com/us/solutions/internetofthings/digital-twins-for-iot-apps-wp-3491953.pdf, Jan. 2017, 9 pages.
Parrott, A. et al., "Industry 4.0 and the Digital Twin," (2017) Deloitte series on Industry 4.0, digital manufacturing enterprises, and digital supply networks, https://www2.deloitte.com/content/dam/insights/us/articles/3833_Industry4-0_digital-twin-technology/DUP_Industry-4.0_digital-twin-technology.pdf, downloaded Dec. 26, 2017, 20 pages.
Pon, B., "How Automakers Can Use Blockchain," Jun. 6, 2017, BigChainDB.com, https://blog.bigchaindb.com/how-automakers-can-use-blockchain-adab79a6505f, downloaded Dec. 27, 2017, 19 pages.
Qing, L., et al., "The Aircraft Service Life and Maintenance Early Warning Management Based on Configuration," the First International Conference on Reliability Systems Engineering (ICRSE), IEEE, 2015, 9 pages.
Reßmann, M. et al., "Industry 4.0: The Future of Productivity and Growth in Manufacturing Industries," Boston Consulting Group 9, Apr. 9, 2015, 14 pages.
Rueckert, T., "Digital Twin + Blockchain," May 16, 2017, SAP News Center, https://news.sap.com/sapphire-now-digital-twin-blockchain/, downloaded Dec. 27, 2017, 7 pages.
Shim, D.H. et al., "A Situation-aware Flight Control System Design using Real-time Model Predictive Control for Unmanned Autonomous Helicopters," AIAA Guidance, Navigation, and Control Conference and Exhibit, vol. 16, Aug. 21-24, 2006, 2 pages.
Steffan, R. et al., "Integration of Virtual Reality based Assembly Simulation into CAD/CAM environments," Industrial Electronics Society, 1998, IECON'98, Proceedings of the 24th Annual Conference of the IEEE. vol. 4. IEEE, Aug. 31-Sep. 4, 1998, pp. 2535-2537.
Swanson, David C., "A General Prognostic Tracking Algorithm for Predictive Maintenance," Aerospace Conference, 2001, IEEE Proceedings, vol. 6. IEEE, Mar. 10-17, 2001, 7 pages.
Tham, B. et al., "Just-In-Time AR-Based Learning in the Advanced Manufacturing Context," Institute for Software Research, ICS2 221, University of California, Irvine, ISR Technical Report # UCI-ISR-17-2, Jun. 2017, 30 pages.
Tobe, F., "Challenges for the Digital Twin concept," Design World, http://www.designworldonline.com/challenges-digital-twin-concept/, Jul. 25, 2016, 10 pages.
Tuegel, E. et al. "Reengineering Aircraft Structural Life Prediction Using a Digital Twin," International Journal of Aerospace Engineering, vol. 2011, Article ID 154798, Aug. 2, 2011, 14 pages.
Van Velzen, "Internet of Things: Five Ways to Overcome Security Challenges," Digitalist Magazine, Dec. 15, 2017, http://www.digitalistmag.com/iot/2017/12/15/internet-of-things-5-ways-to-overcome-security-challenges-05627427, downloaded Dec. 27, 2017, 3 pages.

(56) References Cited

OTHER PUBLICATIONS

Warwick, G., "Digital Twin Would Track Aircraft Health Through Its Life," Aviation Week, http://www.chinaaviationdaily.com/news/37/37092.html, Aug. 14, 2014, 2 pages.
Zhao, P., et al., "Advanced Correlation-Based Anomaly Detection Method for Predictive Maintenance," 2017 IEEE International Conference on Prognostics and Health Management (ICPHM), Jun. 2017, 6 pages.
"Porsche 'Tech Live Look' Pioneers Augmented Reality in U.S. Auto Repairs," Porsche Press Release, May 24, 2018, https://press.porsche.com/prod/presse_pag/PressResources.nsf/Content?ReadForm&languageversionid=864483, 6 pages.
Parris, C., "Minds + Machines: Meet a Digital Twin," GE Digital, Nov. 18, 2016, https://www.youtube.com/watch?v=2dCz3oL2rTw.

\* cited by examiner

708

SYSTEM AND METHOD FOR MAINTAINING AND CONFIGURING ROTORCRAFT

TECHNICAL FIELD

The present invention relates generally to rotorcraft, and, in particular embodiments, to a system and method for maintaining and configuring rotorcraft.

BACKGROUND

Manufacturing and maintaining rotorcraft are complicated and error-prone tasks. Rotorcraft designs may include many systems, and rotorcraft are frequently custom-made to order. As a result, there may be some variation between different rotorcraft of a same product line, depending on the features requested by customers and the availability of parts. Further, maintaining a rotorcraft may call for different maintenance procedures, depending on the configuration of the rotorcraft, both as it was manufactured and as it has been maintained. Streamlining the manufacture and maintenance of rotorcraft may allow total ownership costs to be reduced.

SUMMARY

In an embodiment, a method includes: collecting usage and maintenance data for a rotorcraft at a computer of the rotorcraft; sending the usage and maintenance data to a fleet management server; generating individualized equipment data for the rotorcraft according to the usage and maintenance data at the fleet management server, the individualized equipment data including a lightweight digital representation of the rotorcraft and technical publications for the rotorcraft, the lightweight digital representation including mesh-based 3D visualizations of each component of the rotorcraft, the technical publications having views referencing the mesh-based 3D visualizations; sending the individualized equipment data to the computer of the rotorcraft; and persisting the individualized equipment data at the computer of the rotorcraft.

In some embodiments of the method, sending the usage and maintenance data to the fleet management server includes: sending the usage and maintenance data from the computer of the rotorcraft to a front-end fleet management server, the front-end fleet management server being located in a same network as the computer of the rotorcraft; and forwarding the usage and maintenance data to a back-end fleet management server, the back-end fleet management server being located in a different network than the computer of the rotorcraft. In some embodiments of the method, sending the individualized equipment data to the computer of the rotorcraft includes: sending the individualized equipment data from the back-end fleet management server to the front-end fleet management server; and forwarding the individualized equipment data to the computer of the rotorcraft. In some embodiments of the method, generating the individualized equipment data for the rotorcraft includes: obtaining the individualized equipment data for the rotorcraft from a database; updating the lightweight digital representation of the rotorcraft according to the usage and maintenance data for the rotorcraft; and updating the technical publications for the rotorcraft according to the updated lightweight digital representation. In some embodiments of the method, the usage and maintenance data includes recent usage and maintenance data for the rotorcraft, where the lightweight digital representation of the rotorcraft further includes usage and maintenance history of the rotorcraft, and a bill of materials for the rotorcraft, and where updating the lightweight digital representation of the rotorcraft includes: updating the usage and maintenance history of the rotorcraft according to the recent usage and maintenance data for the rotorcraft; updating the bill of materials for the rotorcraft according to the updated usage and maintenance history; and generating the mesh-based 3D visualizations according to the updated bill of materials. In some embodiments of the method, generating the mesh-based 3D visualizations includes: accessing a solid model of each respective component of the rotorcraft; converting the solid model of each respective component to a polygon mesh; simplifying the polygon mesh of each respective component to reduce a quantity of polygons in the polygon mesh; and creating materials, shaders, and textures for the polygon mesh of each respective component according to design and manufacturing data for the respective component. In some embodiments of the method, the technical publications for the rotorcraft further include instructions, and where updating the technical publications for the rotorcraft includes: generating the instructions for the technical publications; and rendering the views for the technical publications. In some embodiments, the method further includes: defining the views of the technical publications by tagging each component of the rotorcraft with metadata stored in the database. In some embodiments, the method further includes: after generating the individualized equipment data, sending a notification to an operating terminal, the notification indicating that updated individualized equipment data for the rotorcraft is available; and receiving a request from the operating terminal, the individualized equipment data being sent to the computer of the rotorcraft in response to receiving the request. In some embodiments of the method, the rotorcraft is one of a fleet of rotorcraft, and the method further includes: aggregating usage and maintenance data for the fleet of rotorcraft; estimating a life expectancy of each component of the rotorcraft according to the aggregated usage and maintenance data for the fleet of rotorcraft; and identifying a component of the rotorcraft for replacement according to the life expectancy of the component. In some embodiments, the method further includes: analyze the usage and maintenance data with a numerical method to determine forces that each component has been subjected to during flight; and identifying a component of the rotorcraft for preemptive replacement in response to the forces of the component exceeding a predetermined threshold for the component.

In an embodiment, a rotorcraft computer includes: a processor; and a non-transitory computer readable storage medium storing programming for execution by the processor, the programming including instructions for: collecting usage and maintenance data for a rotorcraft from a health and usage monitoring system (HUMS) of the rotorcraft; sending the usage and maintenance data to a fleet management server; receiving individualized equipment data for the rotorcraft from the fleet management server, the individualized equipment data including a lightweight digital representation of the rotorcraft and technical publications for the rotorcraft, the lightweight digital representation including mesh-based 3D visualizations of each component of the rotorcraft, the technical publications having views referencing the mesh-based 3D visualizations; and displaying the technical publications on a remote terminal.

In some embodiments of the rotorcraft computer, the views of the technical publications have a plurality of layers, and where the instructions for displaying the technical publications include instructions for: filtering the views of the technical publications to one of the plurality of layers. In some embodiments of the rotorcraft computer, the instructions for collecting the usage and maintenance data include instructions for: obtaining maintenance records for the rotorcraft from the remote terminal. In some embodiments of the rotorcraft computer, the instructions for collecting the usage and maintenance data include instructions for: obtaining health and usage data from a health and usage monitoring system (HUMS) of the rotorcraft. In some embodiments of the rotorcraft computer, the programming further includes instructions for: performing a self-test of the rotorcraft with the HUMS; detecting an anomaly of the rotorcraft during the self-test; selecting a section of the technical publications corresponding to the anomaly of the rotorcraft; and displaying the selected section of the technical publications on the remote terminal. In some embodiments of the rotorcraft computer, the lightweight digital representation includes a bill of materials for the rotorcraft, and where the programming further includes instructions for: updating control laws (CLAWS) executed by a flight control system of the rotorcraft according to the bill of materials of the rotorcraft. In some embodiments of the rotorcraft computer, the instructions for displaying the technical publications includes instructions for: rendering a computer graphics image using the mesh-based 3D visualizations from the individualized equipment data for the rotorcraft, the computer graphics image being a kinematic simulation of a process from the technical publications. In some embodiments of the rotorcraft computer, the remote terminal is a wearable device, and where the instructions for displaying the technical publications includes instructions for: rendering a holographic overlay with the mesh-based 3D visualizations; and displaying the holographic overlay on the wearable device.

In an embodiment, a server includes: a processor; and a non-transitory computer readable storage medium storing programming for execution by the processor, the programming including instructions for: receiving usage and maintenance data for a rotorcraft from a computer of the rotorcraft; generating individualized equipment data for the rotorcraft according to the usage and maintenance data, the individualized equipment data including a lightweight digital representation of the rotorcraft and technical publications for the rotorcraft, the lightweight digital representation including mesh-based 3D visualizations of each component of the rotorcraft, the technical publications having views referencing the mesh-based 3D visualizations; persisting the individualized equipment data in a database; and sending the individualized equipment data to the computer of the rotorcraft.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nethertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1A:
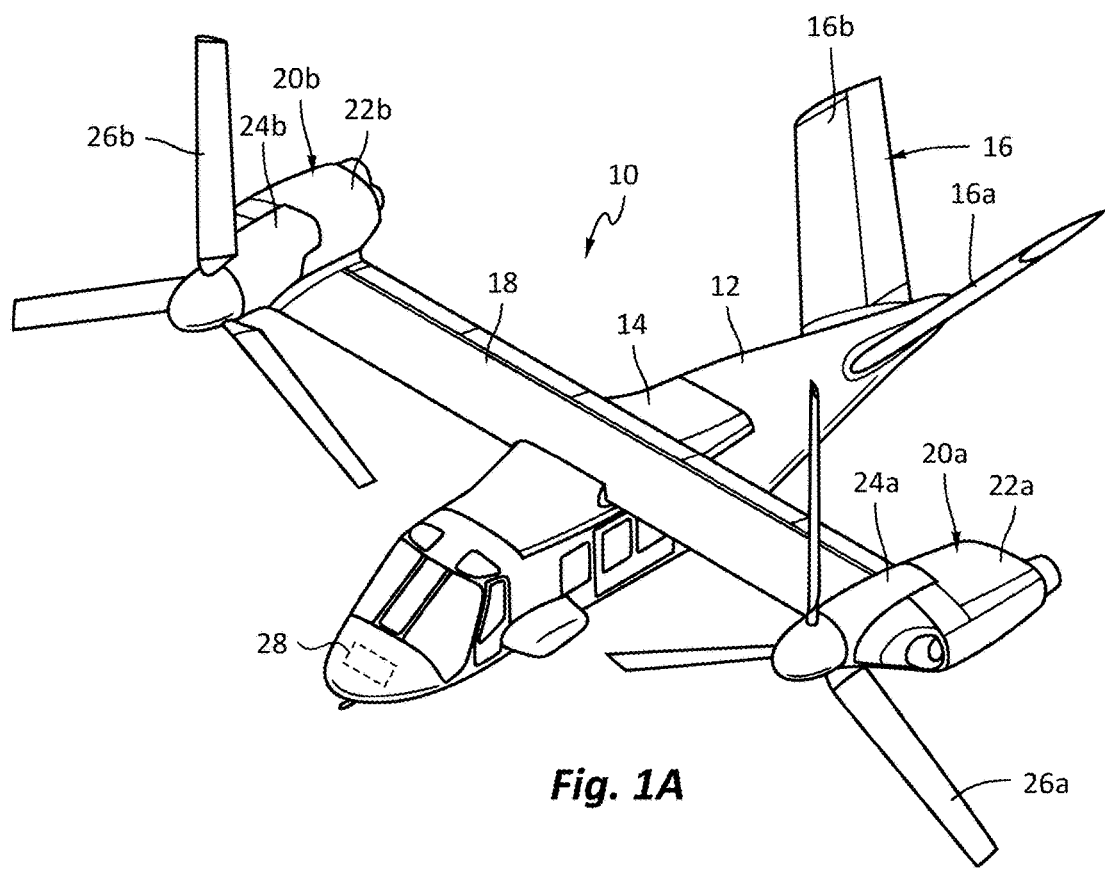
FIGS. 1A and 1B illustrate a rotorcraft, in accordance with some embodiments.
Figure 1B:
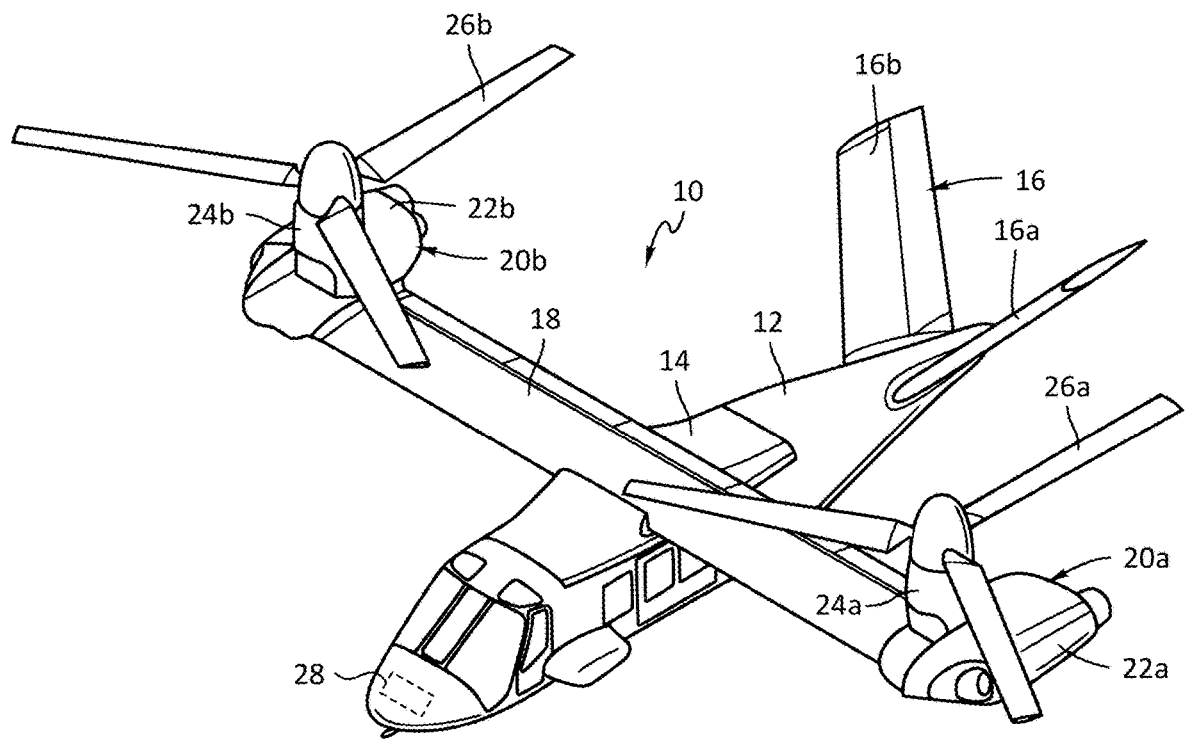

FIGS. 1A and 1B illustrate a rotorcraft 10, in accordance with some embodiments, and are described together. The rotorcraft 10 is a tiltrotor aircraft that operates in a forward flight mode (shown in FIG. 1A), a vertical takeoff and landing (VTOL) flight mode (shown in FIG. 1B), or a conversion flight mode between VTOL and forward flight modes (not shown). The rotorcraft 10 includes a fuselage 12, a wing mount assembly 14 that is rotatable relative to fuselage 12, and a tail assembly 16 mounted at an aft end of the fuselage 12. The fuselage 12 accommodates a crew, passengers, cargo, and/or the like. Further, the fuselage 12 houses some components of the rotorcraft 10, such as displays, controls, instruments, computers, and the like. The wing mount assembly 14 supports a wing 18, which generates lift in forward flight. The tail assembly 16 includes rotatably mounted tail members 16a and 16b, having control surfaces operable for horizontal and/or vertical stabilization during forward flight. Together, the fuselage 12, wing mount assembly 14 tail assembly 16, and wing 18 (as well as their various frames, longerons, stringers, bulkheads, spars, ribs, skins and the like) form the airframe of the rotorcraft 10.

Propulsion assemblies 20a and 20b are fixed at the outboard ends of the wing 18. The propulsion assemblies 20a and 20b, respectively, include fixed nacelles 22a and 22b, pylon assemblies 24a and 24b, and proprotor assemblies 26a and 26b. The fixed nacelles 22a and 22b house an engine and a fixed portion of the drive system for the rotorcraft 10, and are positioned above the wing 18. The pylon assemblies 24a and 24b house a rotatable portion of the drive system for the rotorcraft 10, and are rotatable relative to the wing 18 and the fixed nacelles 22a and 22b. In particular, the pylon assemblies 24a and 24b may be rotated to a substantially vertical orientation (for forward flight, shown in FIG. 1A), a substantially horizontal orientation (for VTOL, shown in FIG. 1B), or an orientation therebetween (for conversion flight mode). The proprotor assemblies 26a and 26b are affixed to the pylon assemblies 24a and 24b, and are rotatable responsive to torque and rotational energy provided by the engine and drive system. During all flight modes, the proprotor assemblies 26a and 26b rotate in opposite directions to provide torque balancing to the rotorcraft 10.

In forward flight mode (shown in FIG. 1A), the proprotor assemblies 26a and 26b rotate in a substantially vertical plane to provide a forward thrust enabling the wing 18 to provide a lifting force responsive to forward airspeed, allowing the rotorcraft 10 to fly in a manner similar to a propeller-driven airplane. In VTOL flight mode (shown in FIG. 1B), the proprotor assemblies 26a and 26b rotate in a substantially horizontal plane to provide a lifting thrust, allowing the rotorcraft 10 to fly in a manner similar to a helicopter. It should be appreciated that rotorcraft 10 may also be operated in a conversion mode, where the proprotor assemblies 26a and 26b are selectively positioned between the horizontal and vertical planes. Further, although the rotorcraft 10 has been described as having one engine in each of the fixed nacelles 22a and 22b, it should be appreciated that other propulsion system arrangements are possible. For example, the rotorcraft 10 may include a single engine providing torque and rotational energy to both of the proprotor assemblies 26a and 26b. The single engine may be housed in the fuselage 12, one of the fixed nacelles 22a or 22b, or the like.

The rotorcraft 10 further includes rotorcraft computers 28. In the embodiment shown, the rotorcraft computers 28 are housed in the fuselage 12, although it should be appreciated that the rotorcraft computers 28 may be located anywhere. Further, the rotorcraft computers 28 may be located in a centralized location or distributed throughout the rotorcraft 10. One or more systems (discussed further below) within the rotorcraft 10 may be partially or wholly embodied on the rotorcraft computers 28 as software and/or hardware for performing any functionality described herein.

Figure 2:
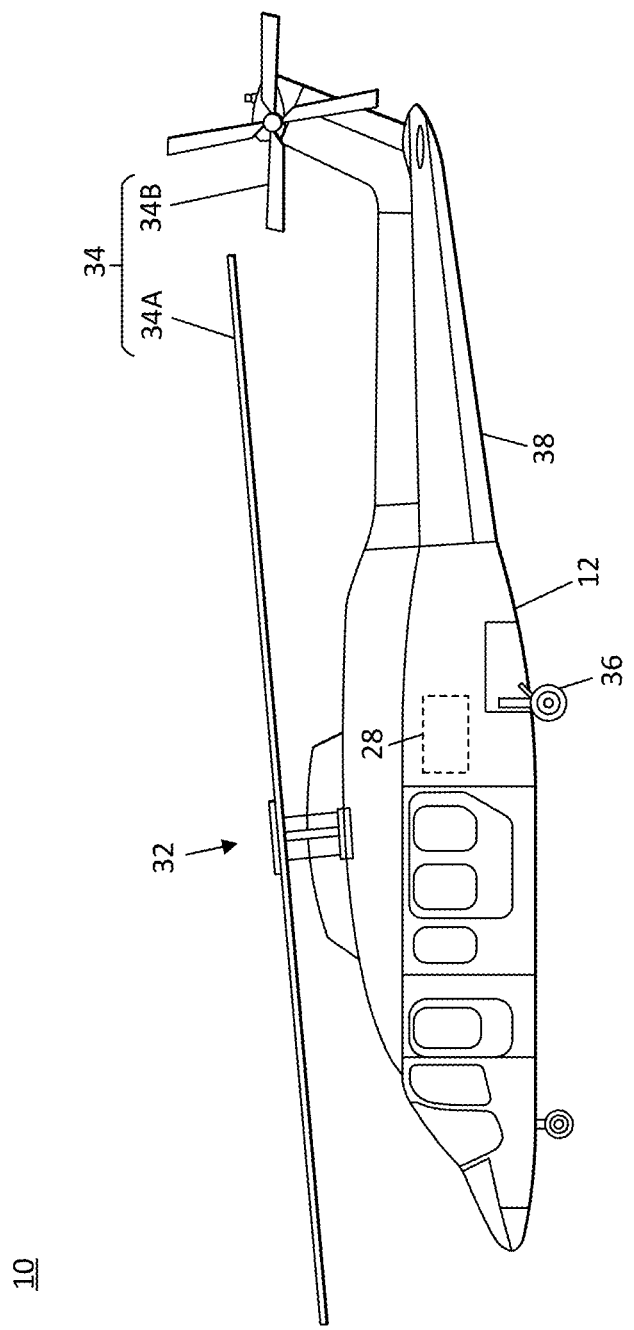
FIG. 2 illustrates a rotorcraft, in accordance with some other embodiments.

FIG. 2 illustrates the rotorcraft 10, in accordance with some other embodiments. In this embodiment, the rotorcraft 10 is a helicopter, and includes a power train system 32, rotor blades 34, landing gear 36, and an empennage 38. The rotor blades 34 include main rotor blades 34A and tail rotor blades 34B. The power train system 32 rotates the main rotor blades 34A and optionally the tail rotor blades 34B. The power train system 32 includes one or more engines, a gearbox, a rotor mast, and a tail rotor drive shaft. The engines supply torque to the rotor mast via the gearbox, thus rotating the main rotor blades 34A. The engines also supply torque to the tail rotor drive shaft, thus rotating the tail rotor blades 34B. The power train system 32 includes a swashplate for collectively or cyclically controlling the pitch of each of the main rotor blades 34A in order to selectively control direction, thrust, and lift of the rotorcraft 10. The fuselage 12 is coupled to the power train system 32 such that the power train system 32 and rotor blades 34 move the fuselage 12 through the air during operation. The landing gear 36 supports the rotorcraft 10 when the rotorcraft 10 is grounded. The empennage 38 represents the tail section of the aircraft and connects the fuselage 12 to the tail rotor blades 34B. The power train system 32 and tail rotor blades 34B collectively provide thrust in the same direction as the rotation of the main rotor blades 34A, so as to counter torque effects created by the main rotor blades 34A.

Although the rotorcraft 10 of FIG. 2 is illustrated in subsequent descriptions, it should be appreciated that embodiments may be applied to any type of rotorcraft, including the rotorcraft 10 of FIGS. 1A and 1B. Some embodiments may also apply to other types of aircraft, such as fixed-wing aircraft. Further, it should be appreciated that embodiments may be applied to other types of customized mass-production vehicles, such as watercraft (e.g., ships, boats, submarines, etc.), land-based vehicles (e.g., armored personnel carriers, tanks, etc.), spacecraft, and the like.

Figure 3A:
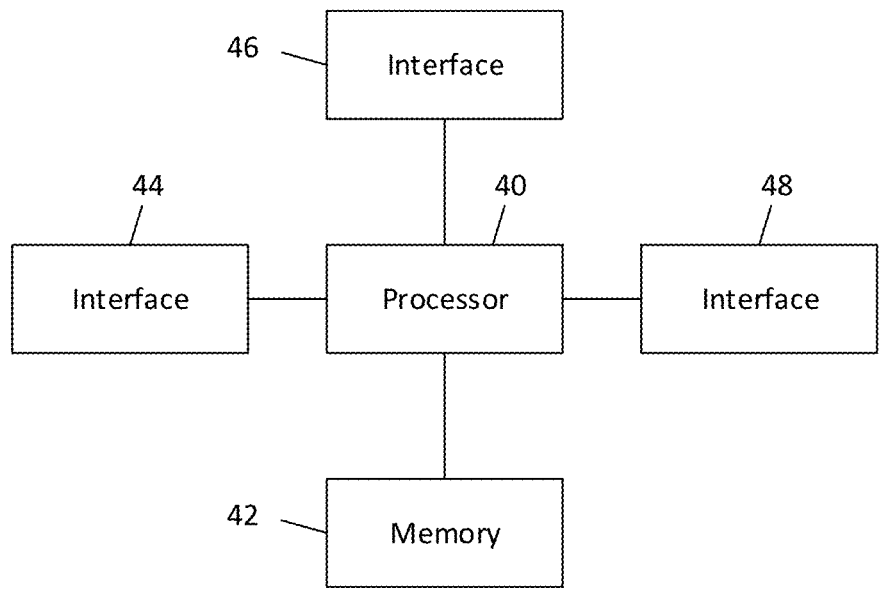
FIG. 3A is a block diagram of a rotorcraft computer, in accordance with some embodiments.

FIG. 3A is a block diagram of a rotorcraft computer 28, in accordance with some embodiments. As shown, the rotorcraft computers 28 include a processor 40, a memory 42, and interfaces 44-48, which may (or may not) be arranged as shown. The processor 40 may be any component or collection of components adapted to perform computations and/or other processing related tasks, and the memory 42 may be any component or collection of components adapted to store programming and/or instructions for execution by the processor 40. In an embodiment, the memory 42 includes a non-transitory computer readable medium. The interfaces 44, 46, 48 may be any component or collection of components that allow the rotorcraft computers 28 to communicate with other devices/components and/or a user. For example, one or more of the interfaces 44, 46, 48 may be adapted to communicate data, control, or management messages from the processor 40 to applications installed on the host device and/or a remote device. As another example, one or more of the interfaces 44, 46, 48 may be adapted to allow a user or user device (e.g., personal computer (PC), etc.) to interact/communicate with the rotorcraft computers 28. The rotorcraft computers 28 may include additional components not depicted, such as long term storage (e.g., non-volatile memory, etc.).

Figure 3B:
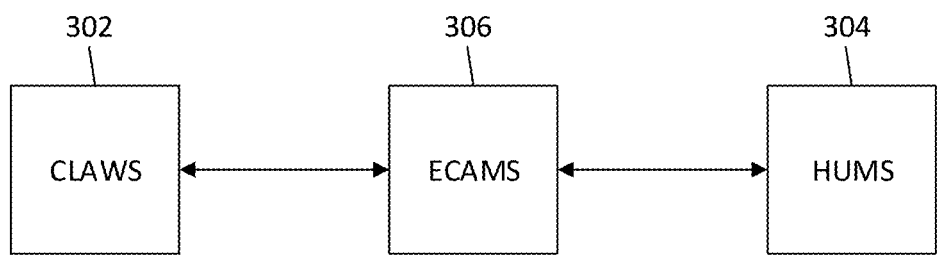
FIG. 3B is a block diagram of systems of a rotorcraft, in accordance with some embodiments.

FIG. 3B is a block diagram of systems of the rotorcraft 10, in accordance with some embodiments. The systems include a flight control system 302, a health and usage monitoring system (HUMS) 304, and an enhanced configuration and maintenance system (ECAMS) 306. The rotorcraft 10 may include other systems, or may omit some of the illustrated systems. Elements of the illustrated systems are implemented at least partially by the rotorcraft computers 28. In some embodiments, the rotorcraft computers 28 include multiple computers that each perform dedicated tasks for one of the systems.

The flight control system 302 is operable to control flight of the rotorcraft 10, and is embodied on flight control computers (FCCs). In some embodiments, the rotorcraft 10 is a fly-by-wire rotorcraft. In such embodiments, the flight control system 302 is operable to execute one or more control laws (CLAWS) that control flight of the rotorcraft 10. In some embodiments, the flight control system 302 is implemented as a series of inter-related feedback loops running certain control laws. The loops include inner stabilization and rate augmentation loops, and outer guidance and tracking loops that are separated from the inner loops. The control laws running in the loops allow for decoupling of otherwise coupled flight characteristics, which in turn provide for more stable flight characteristics and reduced pilot workload. The control loops control flight of the rotorcraft 10 according to signals received from sensors. The sensors include pilot flight control sensors, airspeed sensors, altitude sensors, attitude sensors, position sensors, orientation sensors, temperature sensors, airspeed sensors, or the like. Filters may be applied by the control loops to the signals received or obtained from the sensors. The filters are defined by parameters such as the filter gains, center frequencies, widths, the like, and help stabilize flight control of the rotorcraft 10.

The HUMS 304 is operable to monitor the health and operating conditions of the rotorcraft 10. The HUMS 304 performs data collection and analysis with signals received from sensors, e.g., during flight. The sensors are located on critical (or non-critical) components of the rotorcraft 10, such as on the engine and drive system. The sensors gather data relating to parameters of the monitored components and provide the data to the HUMS 304. The data obtained by the sensors is typically in an analog format, and is converted into a digital format or signal. The HUMS 304 may analyze the signals, or may store the signals and later transfer them to a ground station for operator analysis. For example, if the rotorcraft 10 experiences a high drive shaft torque loading over a certain period of time, the HUMS 304 acquires the relevant data from the sensors for analysis such that timely inspection and/or maintenance of bearings or other rotorcraft systems can be performed. In some embodiments, the HUMS 304 also performs self-testing of the rotorcraft 10, where the HUMS 304 tests different systems of the rotorcraft 10 and analyzes sensor feedback to determine whether those systems have any potential issues that should be investigated. Self-testing may be performed automatically by the HUMS 304 and the results may be stored for later retrieval, e.g., by a maintenance crew.

Figure 3C:
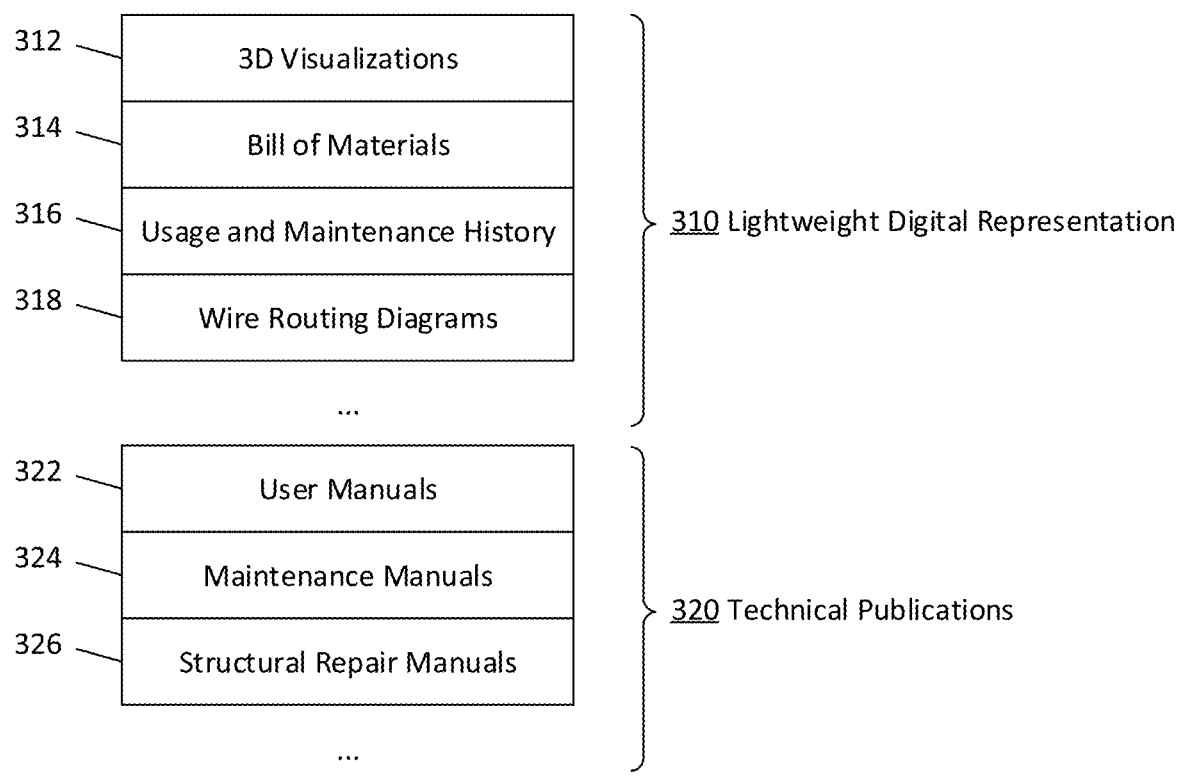
FIG. 3C illustrates a data structure for individualized equipment data, in accordance with some embodiments.

The ECAMS 306 is operable to store individualized equipment data for the rotorcraft 10. FIG. 3C illustrates a data structure for the individualized equipment data, in accordance with some embodiments. The individualized equipment data includes a lightweight digital representation 310 of the rotorcraft 10 and technical publications 320 for the rotorcraft 10.

The lightweight digital representation 310 of the rotorcraft 10 is a collection of configuration and usage data for the rotorcraft 10. The lightweight digital representation 310 includes three-dimensional (3D) visualizations 312 for the rotorcraft 10, a bill of materials (BOM) 314 for the rotorcraft 10, usage and maintenance history 316 of the rotorcraft 10, wire routing diagrams 318 for the rotorcraft 10, and the like. The 3D visualizations 312 include meshes, materials, shaders, textures, and the like for rendering a 3D view of the rotorcraft 10 or its components. The BOM 314 is a list of components and the quantities of each in the rotorcraft 10. Examples of components include raw materials, sub-assemblies, intermediate assemblies, sub-components, pails, and the like. The 3D visualizations 312 include visualizations or models for each component listed on the BOM 314. The usage and maintenance history 316 includes maintenance logs and usage logs for the rotorcraft 10. The maintenance logs track each maintenance task performed on the rotorcraft 10. The usage logs track samples from sensors of the rotorcraft 10 during usage. The maintenance logs and usage logs include data for the entire lifetime of the rotorcraft 10, e.g., going back to the manufacture date of the rotorcraft 10. The lightweight digital representation 310 is customized and specific to the tail number of the rotorcraft 10, and is generated based on manufacturing data, maintenance data, and usage data of the rotorcraft 10.

The technical publications 320 are manuals for the rotorcraft 10. The technical publications 320 include user manuals 322, maintenance manuals 324, structural repair manuals 326, and the like. In some embodiments, the technical publications 320 are flat documents that may be viewed on a display or as printed documents. The flat documents may include two-dimensional (2D) views of the rotorcraft 10. In some embodiments, the technical publications 320 are interactive documents that may be viewed on a tablet, headset, or the like. The interactive documents may include 3D views of the rotorcraft 10 that are rendered on a viewing device. The views (2D or 3D) for the technical publications 320 may be rendered using the lightweight digital representation 310. The technical publications 320 are customized and specific to the tail number of the rotorcraft 10, and may be generated based on the lightweight digital representation 310 of the rotorcraft 10.

The illustrated systems of the rotorcraft 10 may communicate with one another. In some embodiments, the ECAMS 306 communicates with and controls the flight control system 302. For example, the ECAMS 306 may reconfigure the flight control system 302 according to the lightweight digital representation of the rotorcraft 10. In some embodiments, the ECAMS 306 communicates with and receives data from the HUMS 304. For example, sensor signals and self-test results may be obtained from the HUMS 304, and may be analyzed to determine health and usage data for the rotorcraft 10.

Figure 4:
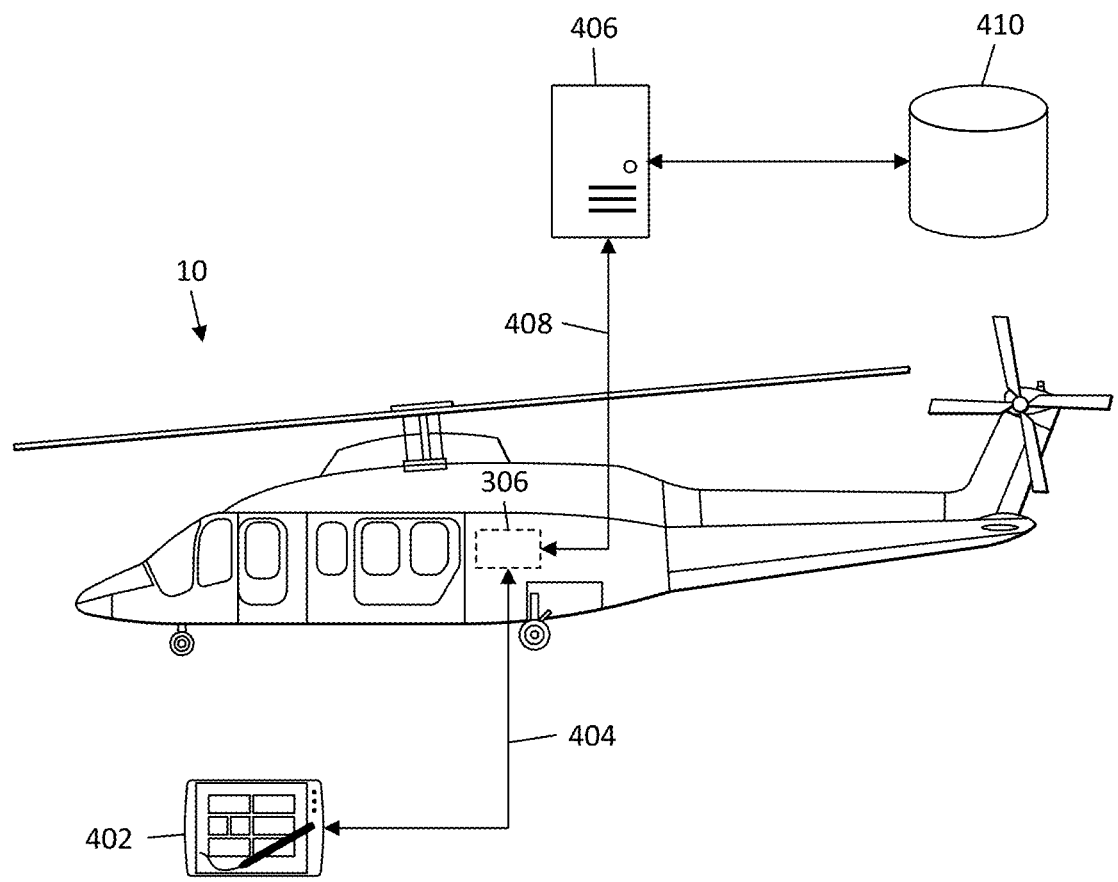
FIG. 4 illustrates a rotorcraft maintenance system, in accordance with some embodiments.

FIG. 4 illustrates a rotorcraft maintenance system 400, in accordance with some embodiments. In the rotorcraft maintenance system 400, a user (such as a maintenance crew member) interacts with the ECAMS 306 using a remote terminal 402. Further, the ECAMS 306 communicates with one or more fleet management servers 406.

The remote terminal 402 may be a tablet, headset, personal computer, or the like, and may communicate with the ECAMS 306 over a connection 404. The connection 404 may be a wired or wireless connection, such as an Ethernet connection, a Wi-Fi connection, a Bluetooth connection, or the like. In some embodiments, the remote terminal 402 is paired with one rotorcraft 10, and interacts with the ECAMS 306 corresponding to the paired rotorcraft 10. The remote terminal 402 may be used to perform several operations with the ECAMS 306. Examples of such operations include viewing the technical publications for the rotorcraft 10, viewing the lightweight digital representation of the rotorcraft 10, entering maintenance records for the rotorcraft 10, and the like.

When viewing technical publications or the lightweight digital representation of the rotorcraft 10, the individualized equipment data is streamed from the ECAMS 306 to the remote terminal 402. Viewing the technical publications may include displaying text from the publications, and rendering views to accompany the text using the 3D visualizations for the rotorcraft 10. Viewing the lightweight digital representation may include viewing the BOM and 3D visualizations for the rotorcraft 10. The remote terminal 402 is a thin client that may be used to view the individualized equipment data for the rotorcraft 10, without persisting the individualized equipment data in the long-term. By storing the individualized equipment data on the ECAMS 306, and not on the remote terminal 402, the individualized equipment data may more easily follow the rotorcraft 10, and may be accessed regardless of whether a given remote terminal 402 is available.

Maintenance records for the rotorcraft 10 may be entered using the remote terminal 402. A maintenance crew may enter records when performing maintenance on the rotorcraft 10. For example, when a given part of the rotorcraft 10 is replaced, the remote terminal 402 may be used to record the replacement in the ECAMS 306. The new maintenance records may be temporarily stored on the ECAMS 306 for transfer to the fleet management servers 406. Maintaining maintenance records for the rotorcraft 10 may be required by law, and entering such records in the ECAMS 306 as the maintenance crew works may help ensure regulatory compliance.

Maintenance records may be entered by several means. In some embodiments, maintenance crew may manually enter maintenance records at the remote terminal 402, including details about replaced or repaired rotorcraft components. In some embodiments, replaced or repaired components may include an coded data marking such as a barcode or a QR code identifying the component(s). The marking may be scanned using the remote terminal 402, and maintenance records may be entered for the identified component(s). For example, a maintenance crew may scan a barcode of a removed component and mark that component as removed from the rotorcraft 10, and may then scan a barcode of an added component and mark that component as installed in the rotorcraft 10. In some embodiments, components of the rotorcraft 10 may include a wireless identifying tag such as a radio-frequency identification (RFID) tag. The ECAMS 306 may detect the presence of installed components by detecting information broadcast by RFID tags of the rotorcraft's components, and may automatically generate maintenance records based on the detected RFID tags.

The ECAMS 306 also communicates with fleet management servers 406 during operation. The fleet management servers 406 may update the individualized equipment data for the rotorcraft 10 based on usage and maintenance data from the ECAMS 306, and may send the updated individualized equipment data back to the rotorcraft 10 for storage on the ECAMS 306. The usage and maintenance data may include health and usage data collected by the HUMS 304 and maintenance records stored at the ECAMS 306. The ECAMS 306 communicates with the fleet management servers 406 over a connection 408. The connection 408 may be a wired or wireless connection, such as an Ethernet connection, a Wi-Fi connection, a cellular connection, a satellite link, an aircraft communications addressing and reporting system (ACARS) link, or the like. The individualized equipment data may be stored in a location accessible to the fleet management servers 406, such as in a database 410. The database 410 may be a relational database, such as a structured query language (SQL) database, or may be a non-relational database, such as a key-value store.

Figure 5:
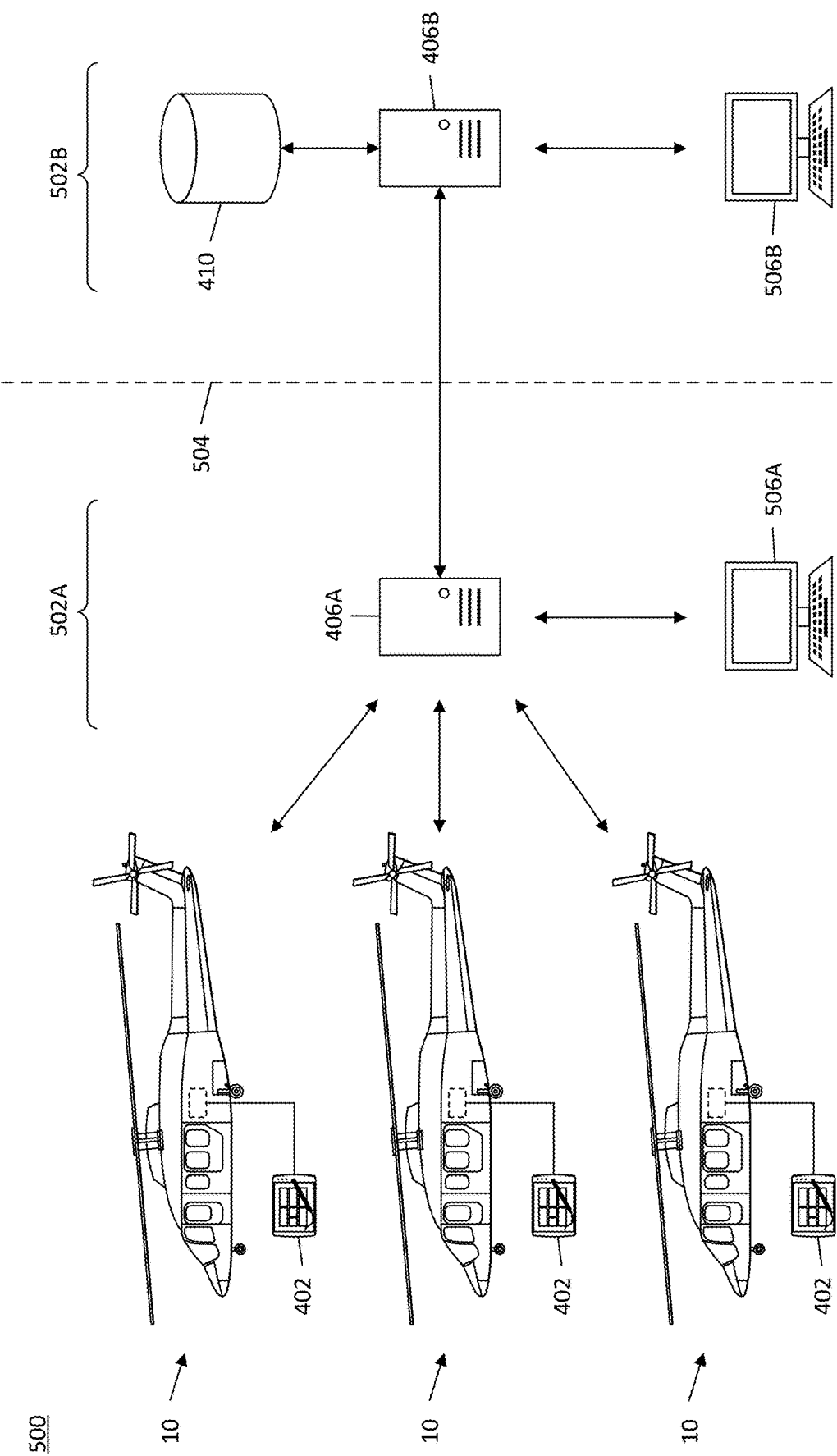
FIG. 5 illustrates a fleet management system, in accordance with some embodiments.

FIG. 5 illustrates a fleet management system 500, in accordance with some embodiments. In the fleet management system 500, the fleet management servers 406 communicate with and manage a fleet of rotorcraft 10, and maintain individualized equipment data for the rotorcraft 10 in the fleet. In particular, the fleet management servers 406 aggregate the usage and maintenance data of the rotorcraft 10 in the fleet, and update the individualized equipment data for the rotorcraft 10 based on the aggregated usage and maintenance data.

In the fleet management system 500, the fleet management servers 406 include servers located on networks 502 operated by different entities. The networks 502 include a front-end network 502A and a back-end network 502B, which may be separated by a firewall 504. In the embodiment shown, the fleet management servers 406 include front-end fleet management servers 406A on the front-end network 502A, and further include back-end fleet management servers 406B on the back-end network 502B. For example, the front-end network 502A may be operated by the owner or maintainer of the rotorcraft 10, and the back-end network 502B may be operated by the manufacturer of the rotorcraft 10. The database 410 may be located on the back-end network 502B with the back-end fleet management servers 406B. The front-end fleet management servers 406A perform a subset of functions, and the back-end fleet management servers 406B perform a different subset of functions. In particular, the front-end fleet management servers 406A may perform the aggregation of fleet data, and the back-end fleet management servers 406B may perform the updating of individualized equipment data for the fleet.

In other embodiments, the fleet management servers 406 are located on a network operated by a single entity. For example, the network may be operated by the owner or maintainer of the rotorcraft 10, or by the manufacturer of the rotorcraft 10. The same set of fleet management servers 406 may perform both the aggregation of fleet data and the updating of individualized equipment data for the fleet.

In some embodiments, the fleet management system 500 further includes operator terminals 506, which communicate with the fleet management servers 406. In the embodiment shown, the operator terminals 506 include front-end operator terminals 506A on the front-end network 502A and back-end operator terminals 506B on the back-end network 502B. The operator terminals 506 are user interfaces for the fleet management system 500, and may be accessed by a user (such as a maintenance crew member). The operator terminals 506 may be used to view fleet status. Further, the fleet management servers 406 may provide notifications to the operator terminals 506. The notifications may include information or warnings about the rotorcraft 10 in the fleet.

Although only one front-end network 502A is shown, in some embodiments, the back-end fleet management servers 406B communicate with front-end fleet management servers 406A from multiple networks. Each network may be operated by a different entity. For example, back-end fleet management servers 406B for a single manufacturer may communicate with multiple front-end fleet management servers 406A for multiple customers. Cross-fleet analysis may be performed based on the individualize equipment data for the various fleets.

Figure 6:
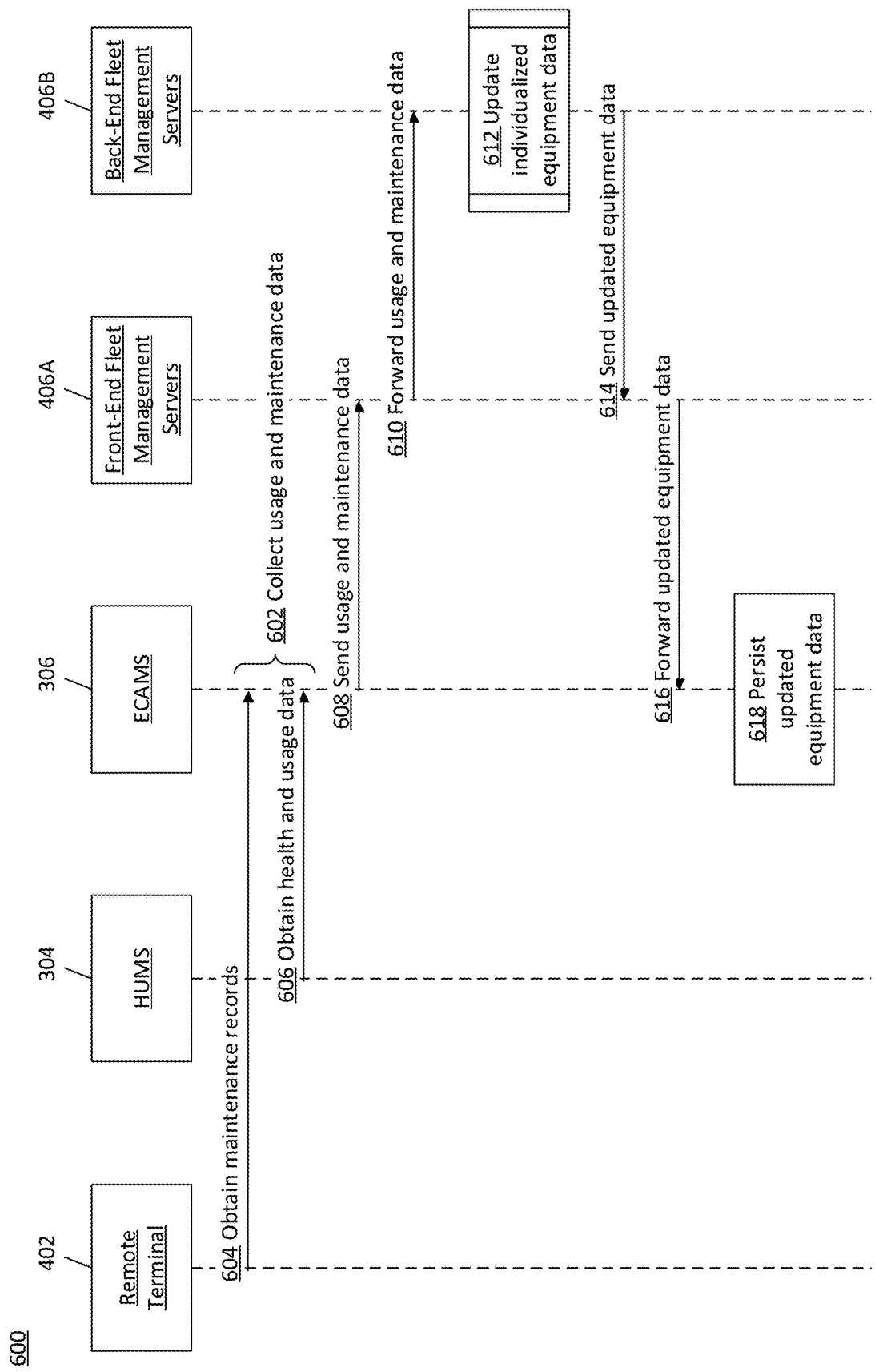
FIG. 6 is a protocol diagram showing operations when updating individualized equipment data for a rotorcraft, in accordance with some embodiments.

FIG. 6 is a protocol diagram 600 showing operations when updating individualized equipment data for the rotorcraft 10, in accordance with some embodiments. Operations shown in the protocol diagram 600 may be performed periodically, or in response to a user requesting updated equipment data, e.g., with the remote terminal 402. In some embodiments, the operations are performed automatically in response to a particular event, such as in response to the connection 408 being established or restored.

The ECAMS 306 collects usage and maintenance data for the rotorcraft 10 (step 602). In the embodiment shown, the ECAMS 306 collects the usage and maintenance data by obtaining maintenance records, such as those entered by a maintenance crew with the remote terminal 402 (step 604) and by obtaining health and usage data from the HUMS 304 (step 606). The usage and maintenance data may not include all historic data for the rotorcraft 10, but rather may be data about usage and maintenance of the rotorcraft 10 since the last update of the individualized equipment data.

The ECAMS 306 sends the collected usage and maintenance data to the fleet management servers 406. The maintenance records, usage, and self-test data may be temporarily stored on the ECAMS 306 and then sent to the fleet management servers 406 when data collection is completed. In the embodiment shown, the usage and maintenance data is sent to the front-end fleet management servers 406A (step 608) and is then forwarded to the back-end fleet management servers 406B (step 610). In some embodiments, the front-end fleet management servers 406A aggregate the usage and maintenance data for some or all of the rotorcraft 10 in the fleet, and forward the aggregated data to the back-end fleet management servers 406B periodically. For example, aggregated data may be forwarded at a regular time interval. The aggregated data may be forwarded in a single request, to reduce the total quantities of round trips to the back-end fleet management servers 406B. In embodiments where the fleet management servers 406 are located on a network operated by a single entity, the forwarding step may be omitted.

The fleet management servers 406 update the individualized equipment data for the rotorcraft 10 (step 612). The fleet management servers 406 obtain the current individualized equipment data by retrieving it from the database 410 based on the tail number of the rotorcraft 10. The individualized equipment data (e.g., the technical publications and the lightweight digital representation) for the rotorcraft 10 is then updated (discussed further below) according to the received usage and maintenance data from the ECAMS 306. The updating may also be performed according to proprietary information accessible to the fleet management servers 406, such as design and manufacturing data for the rotorcraft 10. Updating the individualized equipment data allows it to accurately reflect the state of the rotorcraft 10 as it is maintained at any given point in time. The updated individualized equipment data is then persisted in the database 410.

In some embodiments, the back-end fleet management servers 406B host a publicly accessible service or application programming interface (API) for updating the individualized equipment data of the rotorcraft 10. For example, the API may accept the aggregated usage and maintenance data as an input parameter, and may produce the updated individualized equipment data as an output parameter. As noted above, generating the individualized equipment data for the rotorcraft 10 may be performed using proprietary information from the manufacturer. Separating the aggregation of data from the updating of individualized equipment data, and performing updating with a publicly accessible API may allow the individualized equipment data to be updated by the manufacturer without sharing the proprietary information with customers of the rotorcraft 10.

The fleet management servers 406 then send a copy of the updated individualized equipment data to the ECAMS 306. In the embodiment shown, the updated individualized equipment data is sent to the front-end fleet management servers 406A (step 614) and is then forwarded to the ECAMS 306 (step 616). In embodiments where the fleet management servers 406 are located on a network operated by a single entity, the forwarding step may be omitted. In some embodiments, the updated individualized equipment data is sent in its entirety to the ECAMS 306. In some embodiments, differences between the old and updated individualized equipment data are determined, and the differences are sent to the ECAMS 306. Some portions of the lightweight digital representation (such as the 3D visualizations) may be large in size. Sending the updated individualized equipment data to the ECAMS 306 by sending differences between the old and updated data may reduce the bandwidth consumed by the fleet management servers 406. The ECAMS 306 persists the received individualized equipment data (step 618). The individualized equipment data may be stored on, e.g., the memory 42 of the rotorcraft computers 28.

Figure 7:
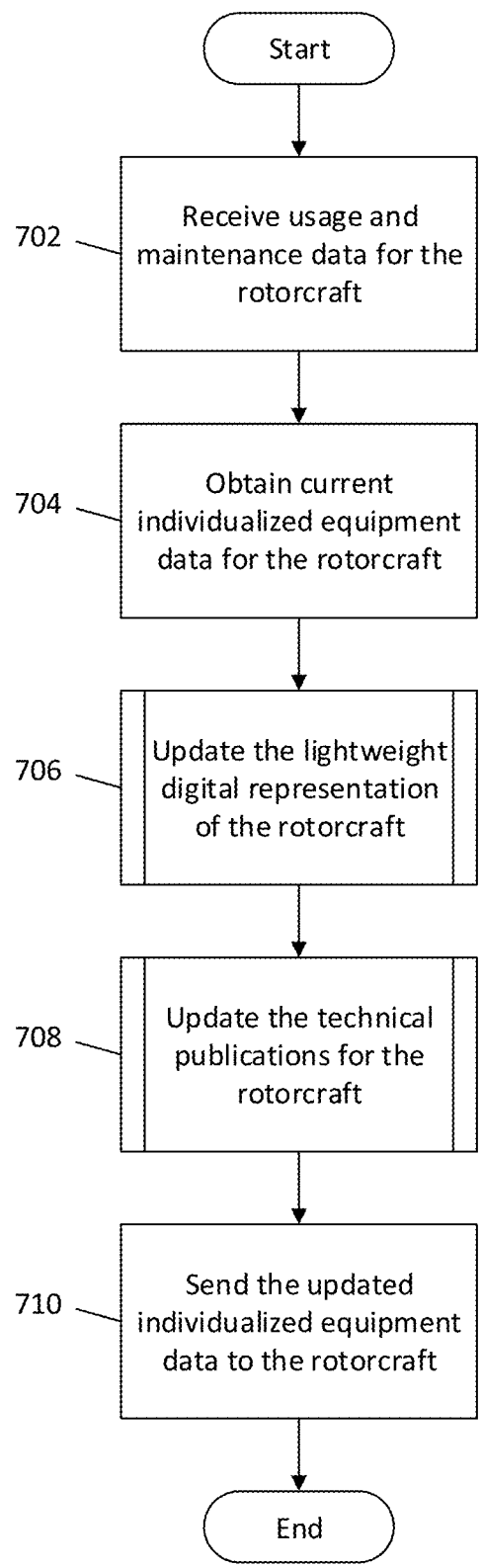
FIG. 7 is a flow diagram of a method for updating individualized equipment data for a rotorcraft, in accordance with some embodiments.

FIG. 7 is a flow diagram of a method for updating the individualized equipment data for a rotorcraft 10, in accordance with some embodiments. The illustrated steps may be performed by the back-end fleet management servers 406B during step 612 of the protocol diagram 600 (see FIG. 6).

The usage and maintenance data for the rotorcraft 10 is received (step 702). The usage and maintenance data is received from the ECAMS 306 of the rotorcraft 10. Continuing the above example, the usage and maintenance data may include health and usage data collected by the HUMS 304 of the rotorcraft 10, and maintenance records stored at the ECAMS 306 of the rotorcraft 10.

The current individualized equipment data for the rotorcraft 10 is obtained (step 704). The data from the ECAMS 306 may include the tail number of the rotorcraft 10. The database 410 may include individualized equipment data for multiple rotorcraft, indexed with the tail number of each rotorcraft. The fleet management servers 406 obtain the current individualized equipment data by retrieving it from the database 410, e.g., by using the tail number of the rotorcraft 10 as the searching key.

The lightweight digital representation of the rotorcraft 10 is updated (step 706). The lightweight digital representation is updated according to the usage and maintenance data received from the ECAMS 306. In particular, the BOM, 3D visualizations, wire routing diagrams, and usage and maintenance history of the rotorcraft 10 may all be updated (discussed further below) according to the usage and maintenance data. For example, when a component of the rotorcraft 10 is replaced, the BOM may be changed to reflect the new component, and the 3D visualizations may be updated to replace the visualization(s) of the old component with the visualization(s) of the new component. The lightweight digital representation may thus reflect the most recent as-maintained configuration of the rotorcraft 10.

The technical publications for the rotorcraft 10 are updated (step 708). The technical publications are updated according to the updated lightweight digital representation of the rotorcraft 10. In particular, the user manuals, maintenance manuals, and structural repair manuals may be updated (discussed further below) in view of the changes in the BOM, 3D visualizations, and/or wire routing diagrams of the rotorcraft 10. The technical publications may thus reflect the most recent as-maintained configuration of the rotorcraft 10.

After steps 706 and 708, the updated individualized equipment data includes the updated technical publications and the updated lightweight digital representation. The updated individualized equipment data is sent to the rotorcraft 10 (step 710). The updated individualized equipment data is sent to the ECAMS 306 of the rotorcraft 10 and persisted. The updated individualized equipment data is also persisted at the fleet management servers 406, e.g., by updating the individualized equipment data for the rotorcraft 10 in the database 410.

Figure 8:
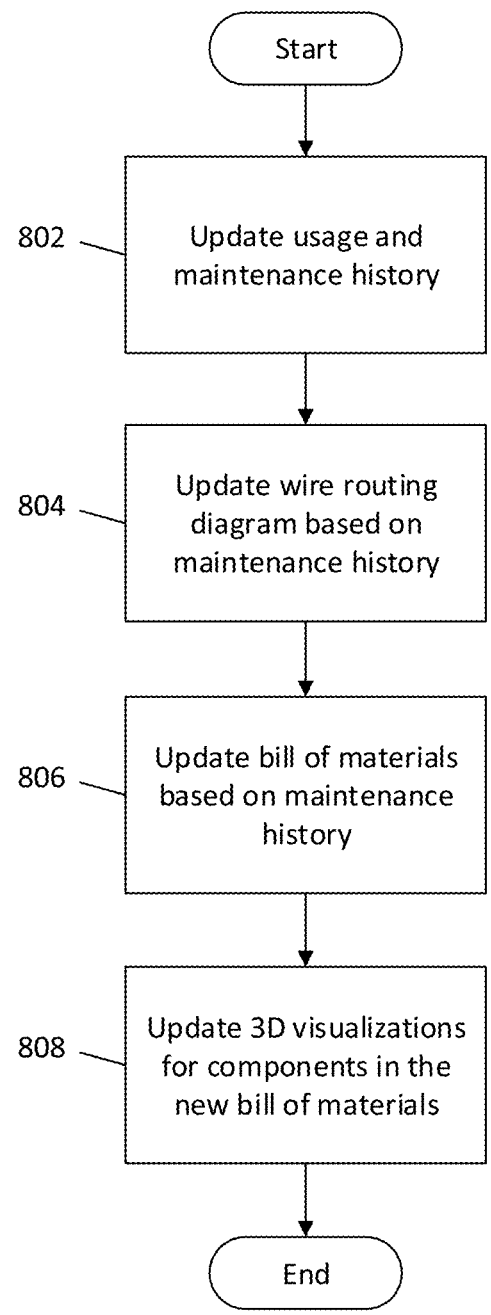
FIG. 8 is a flow diagram of a method for updating a lightweight digital representation of a rotorcraft, in accordance with some embodiments.

FIG. 8 is a flow diagram of a method for updating the lightweight digital representation of the rotorcraft 10, in accordance with some embodiments. The illustrated steps may be performed by the back-end fleet management servers 406B during step 706 of the method 700 (see FIG. 7).

The usage and maintenance history for the rotorcraft 10 is updated (step 802). The usage and maintenance history of the rotorcraft 10 are updated with new sensor data provided by the HUMS 304, e.g., as part of the usage and maintenance data sent from the ECAMS 306. The usage and maintenance history stored in the lightweight digital representation includes lifetime data for the rotorcraft 10, but the usage and maintenance data from the ECAMS 306 includes data collected since the last update of the individualized equipment data. The usage and maintenance history is updated by copying new records from the received data into the usage and maintenance history. The usage and maintenance history includes an as-built configuration of the rotorcraft 10, and records components that were added to or removed from the rotorcraft 10. By starting with the as-built configuration, the usage and maintenance history may be traced to determine the as-maintained configuration of the rotorcraft 10 at any point in time.

The wire routing diagrams for the rotorcraft 10 are updated based on the updated usage and maintenance history (step 804). The wire routing diagrams for the rotorcraft 10 are updated to reflect changes in components or wiring elements. When a wiring element (e.g., wire, cable, group of wires, or wiring harness) is replaced, the old wiring element is removed from the wire routing diagrams and the new wiring element is added to the wire routing diagrams. The wire routing diagrams may include information about where the new wiring element is located, such as the panel(s) that the new wiring element is located behind. The wire routing diagrams may also include the length of the wiring elements. The length and location of the new wiring element may be included with the usage and maintenance data received from the ECAMS 306, and may be data entered by maintenance crew using the remote terminal 402 during rewiring. In addition to including the length and location of the wiring elements, the wire routing diagrams may also include associated information about the wiring elements, such as the wire connectors, gauge of the wires, wire types, and the like.

The BOM for the rotorcraft 10 is updated based on the updated usage and maintenance history (step 806). The BOM is updated to reflect the addition, removal, or replacement of components. In some embodiments, the usage and maintenance history directly indicates that certain components were added or removed. In some embodiments, the usage and maintenance history has more general entries. For example, the usage and maintenance history may indicate indicates an add-in kit was installed, but not include a listing of the components in the kit. The database 410 may include a mapping of kits to components, which is used to determine BOM changes when a kit is installed or removed.

The 3D visualizations for the rotorcraft 10 are updated based on the updated BOM. (step 808). For components removed from the BOM, the visualizations (e.g., meshes, materials, shaders, textures, and the like) corresponding to those components are removed from the 3D visualizations for the rotorcraft 10. For components added to the BOM, the visualizations (e.g., meshes, materials, shaders, textures, and the like) corresponding to those components are generated and copied into the 3D visualizations for the rotorcraft 10. By updating the 3D visualizations, any rendered views of the rotorcraft 10 will reflect the current configuration of the rotorcraft 10.

The 3D visualizations may be updated based on the design and manufacturing data for added components. The fleet management servers 406 may have access to design and manufacturing data for the rotorcraft 10. The design and manufacturing data may be, e.g., computer-aided design (CAD), computer-aided manufacturing (ECAM), and/or computer-aided engineering (CAE) source files for the rotorcraft 10. For example, the source files may be for a system such as Dassault Systemes CATIA, Siemens NX, or the like. The design and manufacturing data may be stored in the database 410, or stored in another (separate) database. Some portions of the 3D visualizations, such as the materials, shaders, and textures, may be generated or updated based on the design and manufacturing data, in combination with the usage and maintenance data. For example, the design and manufacturing data may indicate that a particular new component is beige and formed from rubber, and so the 3D visualization for the new component is generated having materials, shaders, and textures that render as beige rubber on the remote terminal 402.

Figure 9:
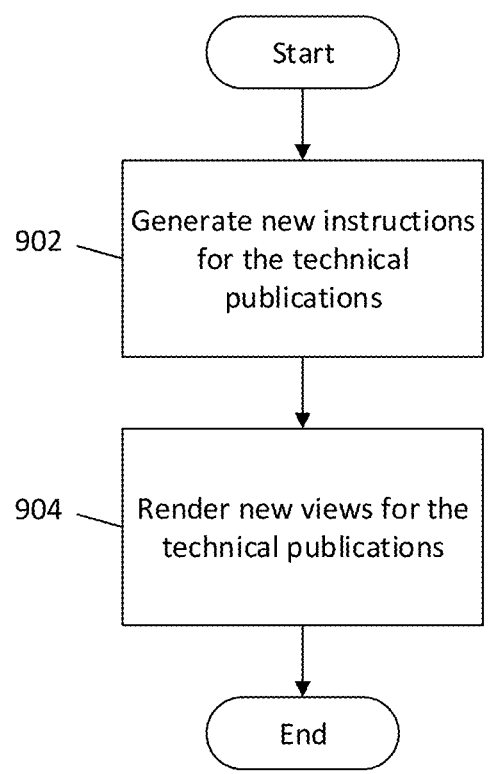
FIG. 9 is a flow diagram of a method for updating technical publications for a rotorcraft, in accordance with some embodiments.

FIG. 9 is a flow diagram of a method for updating the technical publications for the rotorcraft 10, in accordance with some embodiments. The illustrated steps may be performed by the back-end fleet management servers 406B during step 708 of the method 700 (see FIG. 7).

New instructions are generated for the technical publications (step 902). The new instructions are generated based on the lightweight digital representation of the rotorcraft 10. For example, instructions for assembly and disassembly of the rotorcraft 10 may be automatically generated based on the updated BOM and wire routing diagrams. Instructions for performing maintenance procedures may change depending on the configuration of the rotorcraft 10, and in particular, may change depending on which components are installed in the rotorcraft 10. A particular maintenance procedure may be accomplished in different steps depending on the presence or absence of certain components. The steps required to perform a maintenance procedure may be defined and stored in the database 410. The steps to perform each maintenance procedure are determined according to the components installed in the rotorcraft 10, as reflected in the BOM for the rotorcraft 10. The steps are then assembled to produced individualized technical publications for the rotorcraft 10.

New views are rendered for the technical publications (step 904). The new views are rendered based on the lightweight digital representation of the rotorcraft 10. Maintenance procedures may include views that show certain components of the rotorcraft 10. The views may show the desired components, and may also show other nearby components to provide visual context for maintenance crew. Views may be defined and stored in the database 410, with each view definition indicating or referencing one or more components that should be shown in the view. The views for the technical publications are rendered using the view definitions, and the updated BOM and 3D visualizations for the rotorcraft 10. The components called for by the view definitions are rendered using the 3D visualizations for those components. The BOM is then used to determine which components are nearby. The nearby components are also rendered using the 3D visualizations for those components. Individualized views may thus be generated for the technical publications. A single technical publication may include multiple views, and the change of one component may need to be reflected in many views. Rendering new views for each technical publication with the new 3D visualization of the rotorcraft 10 allows component changes to be cascaded through the technical publication, and allows the views in the technical publication to accurately reflect the most recent as-maintained configuration of the rotorcraft 10.

Figure 10:
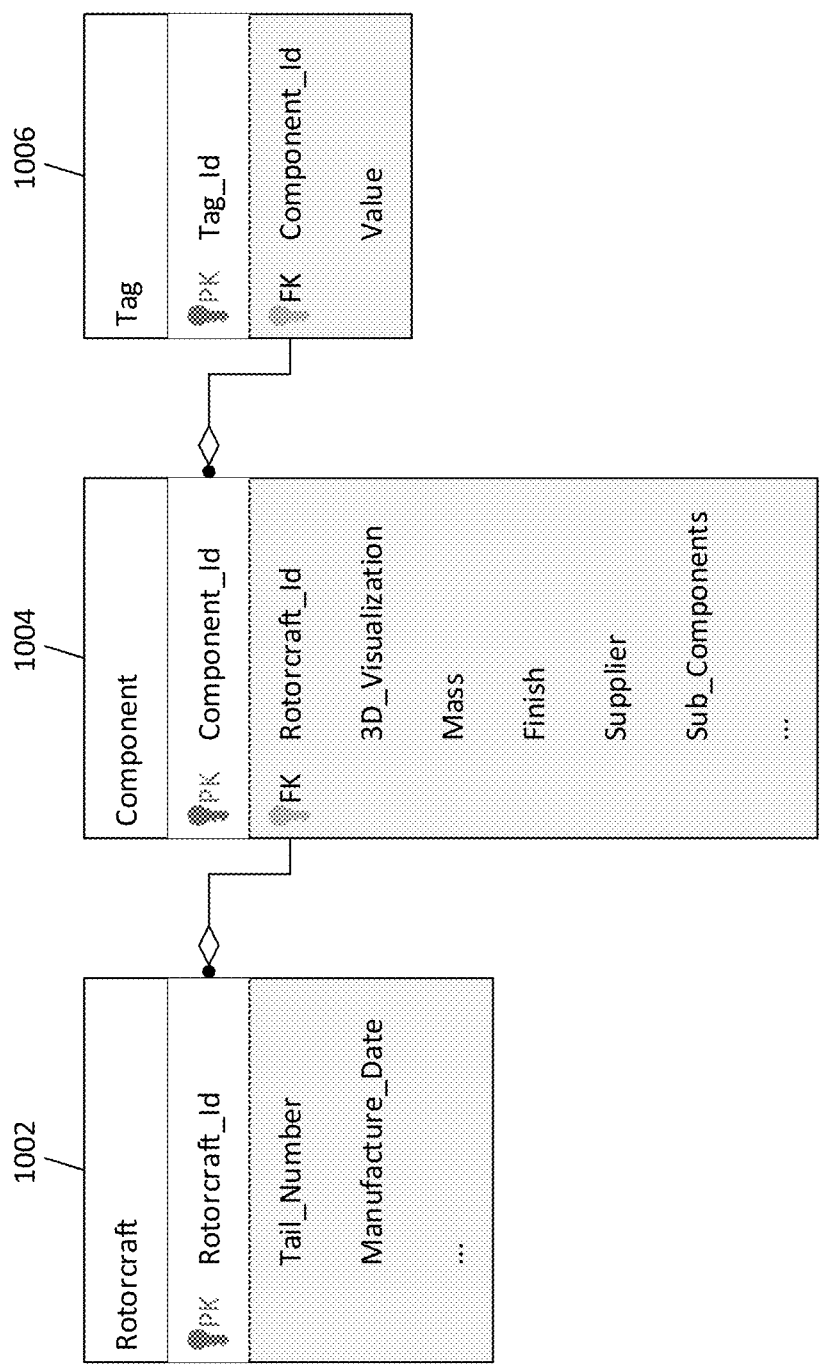
FIG. 10 is a database diagram, in accordance with some embodiments.

FIG. 10 is a database diagram of tables stored in the database 410, in accordance with some embodiments. The information stored in the tables of the database 410 is accessed by the fleet management servers 406, and used when updating the individualized equipment data for the rotorcraft. The individualized equipment data is also stored in the tables of the database 410. The database 410 includes, among other tables, a rotorcraft table 1002, a component table 1004, and a tag table 1006.

The rotorcraft table 1002 includes one row for each rotorcraft in the database 410. Each rotorcraft in a fleet has an entry. Among other columns, the rotorcraft table 1002 includes a column for the tail number of each rotorcraft. Looking up information for the rotorcraft, such as the individualized equipment data or the design and manufacturing data, may be performed by searching the tail number column for a given tail number. Additional user-defined data for each rotorcraft may be stored in the rotorcraft table 1002.

The component table 1004 includes one row for each component in the database 410. Each rotorcraft comprises multiple components, and each component table 1004 entry is associated with one rotorcraft table 1002 entry. The component table 1004 includes many columns. For example, the illustrated component table 1004 includes columns for the mass, finish, supplier, etc. of each component. Notably, the 3D visualization for each component is stored with the component.

In some embodiments, entries in the component table 1004 are persisted for the life of each component. For example, when a component is manufactured, a row for it is added to the component table 1004. The entry for the component is maintained before the component is installed on a rotorcraft, and after the component is removed from the rotorcraft. In some operating scenarios, rotorcraft may be rebuilt, or components may be moved from one rotorcraft to another. By tracking components for their lifetime, the data associated with the component (e.g., usage data) is persisted even when the component is moved between rotorcraft.

The tag table 1006 includes metadata associated with each component of the rotorcraft. The metadata may be any type of data, and may include one or more value fields. The metadata may be used for many purposes. For example, notes about the components may be stored in the tag table 1006. Likewise, notes to a particular maintenance or manufacturing may be stored in the tag table 1006.

As noted above, the 3D visualization for each component is stored with the component. In some embodiments, the 3D visualization is stored in a binary data type column of the component table 1004. In some embodiments, the 3D visualization is stored outside of the database 410, and a link to the 3D visualization is stored in a column of the component table 1004. Each component has its own 3D visualization. A 3D visualization for a rotorcraft may thus be built from the individual 3D visualizations of each constituent component of the rotorcraft. Views for the technical publications may be defined with metadata stored in the tag table 1006. A particular view for a technical publication may be defined by tagging the components included in that view. Views in the technical publications may thus be rendered with data from the tag table 1006 and component table 1004. In particular, the tag table 1006 may be searched to determine which components are tagged for a particular view. The 3D visualizations for those components may then be retrieved, assembled, and rendered to create the view.

Figure 11:
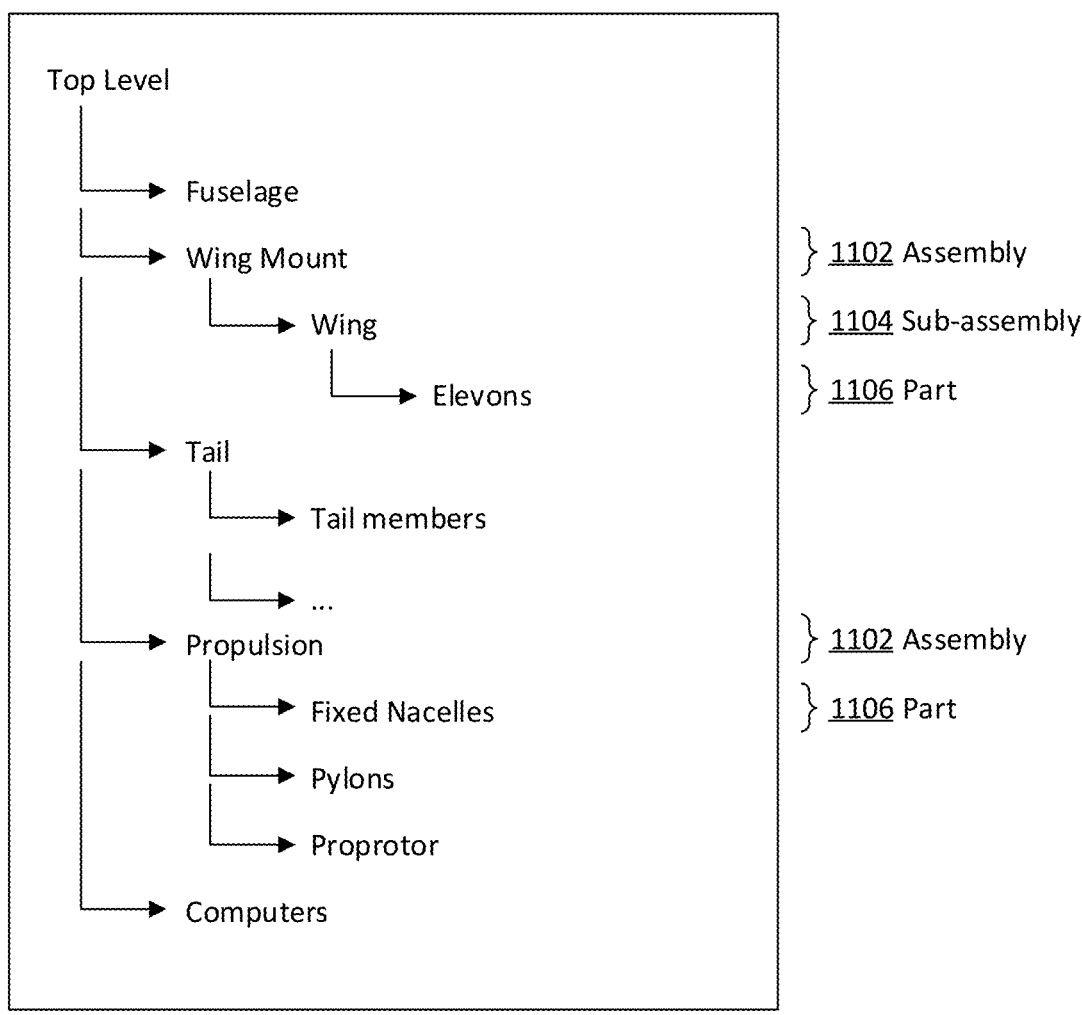
FIG. 11 illustrates an example bill of materials for a rotorcraft, in accordance with some embodiments.

FIG. 11 illustrates an example BOM 314, in accordance with some embodiments. The BOM 314 is a hierarchical document of components, organized by assemblies 1102, sub-assemblies 1104, and parts 1106. The top level of the BOM 314 includes one or more assemblies 1102. Each of the assemblies 1102 may (or may not) include one or more sub-assemblies 1104. The assemblies 1102 and sub-assemblies 1104 each include one or more parts 1106. For example, in the rotorcraft 10 of FIGS. 1A and 1B, the wing mount assembly 14 is an assembly that includes sub-assemblies such as the wing 18, and the wing 18 includes parts such as elevons (not shown). The rotorcraft 10 includes many other assemblies 1102, sub-assemblies 1104, and parts.

The BOM 314 defines the configuration of a rotorcraft. Each entry on the BOM 314 corresponds to one component of the rotorcraft, e.g., one entry in the component table 1004. The BOM 314 may define the rotorcraft as it was designed, as it was ordered, as it was manufactured, or as it has been maintained. In some embodiments, more than one BOM 314 is generated by the fleet management servers 406 and stored in the database 410. For example, a first BOM may reflect the rotorcraft as it was manufactured, and a second BOM may reflect the rotorcraft as it has been maintained. The BOMs 314 are also stored on the ECAMS 306.

Figure 12:
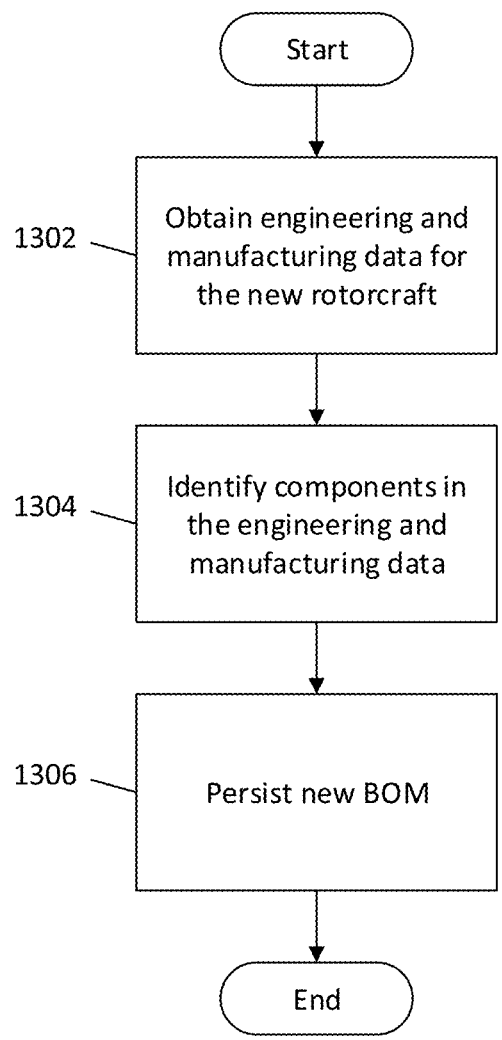
FIG. 12 is a flow diagram of a method for producing a bill of materials for a rotorcraft component, in accordance with some embodiments.

FIG. 12 is a flow diagram of a method for producing a BOM for a rotorcraft component, in accordance with some embodiments. The illustrated steps may be performed by the back-end fleet management servers 406B when a new rotorcraft is added to the database 410. A rotorcraft may be added when the rotorcraft is manufactured or ordered for manufacturing.

Design and manufacturing data for the new rotorcraft is obtained (step 1202). The design and manufacturing data may be stored in another location, and may be defined for a family of rotorcraft. In embodiments where the back-end fleet management servers 406B are separated from the front-end fleet management servers 406A, the design and manufacturing data may be stored in a location that is only accessible to the back-end fleet management servers 406B, such as in another database.

The components of the rotorcraft in the design and manufacturing data are identified (step 1204). For example, entries in the design and manufacturing data may be iterated through, and a new entry in the BOM is created for each entry in the design and manufacturing data. Each entry in the BOM comprises one component and a location for that component. The location is defined in 3D spaced, e.g., by X, Y, and Z coordinates. The location for each entry may also include the orientation of that component.

The new BOM is persisted (step 1206). The persisting is performed by storing an entry for the new rotorcraft in the rotorcraft table 1002, and by storing one entry for each component in the component table 1004.

Each entry on the BOM 314 has an associated 3D visualization stored in the database 410. Each 3D visualization is a 3D computer graphic. Each computer graphic includes a polyhedral object whose shape is defined by a polygon mesh. A polygon mesh is a collection of vertices, edges, and faces. Each polygon mesh is an approximation of a component's shape. Each component's 3D visualization also includes materials, shaders, and textures for the mesh, which collectively are used to render the component.

The components may be originally defined as solid models in a CAD system. The solid models may be represented by any scheme, such as a boundary representation, a cell decomposition, or the like. A solid model is a precise definition of a component's shape. Although solid models have greater physical fidelity than computer graphics, computer graphics are small and easier to render than solid models. The remote terminals 402 used in the rotorcraft maintenance system 400 (see FIG. 4) may be handheld or wearable devices that have limited computing resources. In accordance with some embodiments, the solid model representations of the components are converted to 3D computer graphic (e.g., mesh) representations of the components. The mesh-based 3D visualizations are included with the individualized equipment data sent to the ECAMS 306, and may be more easily viewed on the remote terminals 402.

Figure 13:
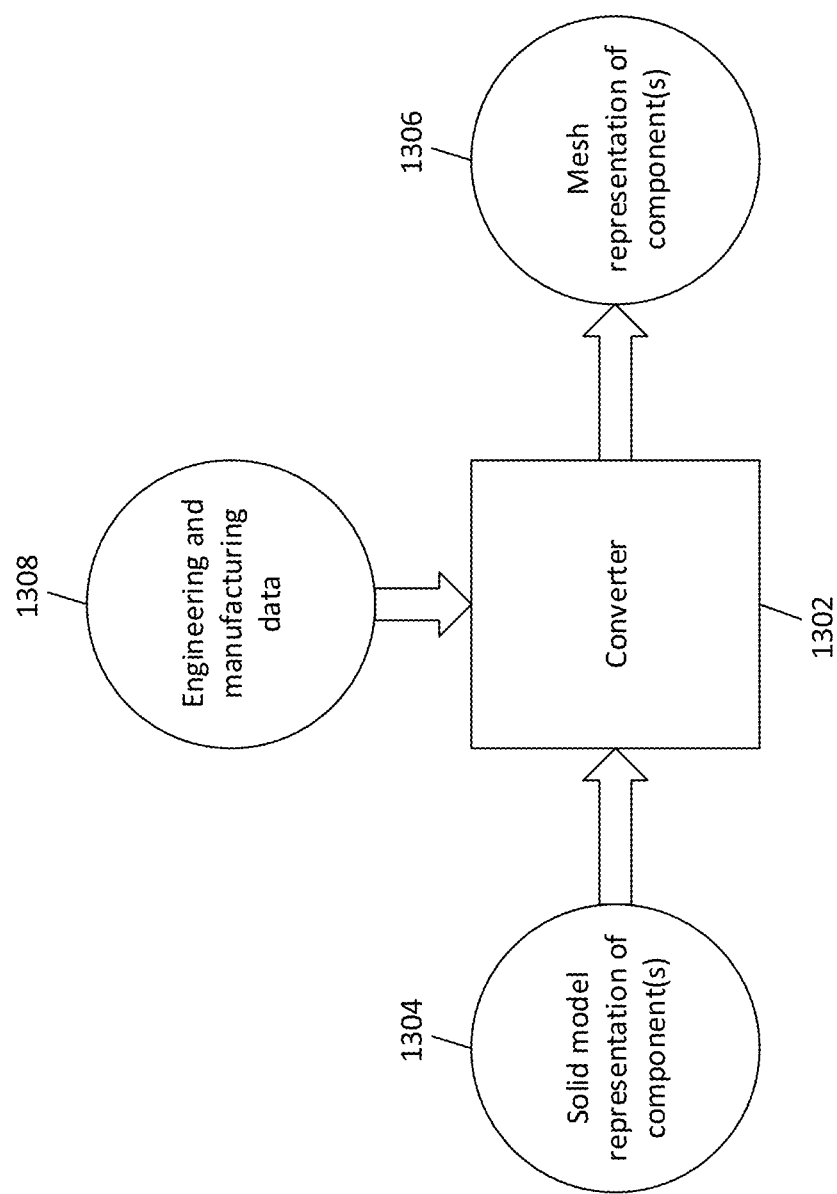
FIG. 13 illustrates conversion of component visualizations, in accordance with some embodiments.

FIG. 13 illustrates conversion of component visualizations, in accordance with some embodiments. A conversion unit 1302 is operable to convert solid model representations 1304 of rotorcraft components to mesh representations 1306 of the rotorcraft components. Design and manufacturing data 1308 for the rotorcraft is also used to produce the mesh representations 1306 of the rotorcraft. As discussed further below, producing the mesh representations 1306 of the rotorcraft may include producing detailed meshes, and then simplifying the meshes to reduce the complexity and polygon count of the meshes. The design and manufacturing data 1308 may inform the mesh simplification process. Further, the design and manufacturing data 1308 is used to generate the materials, shaders, and textures for the meshes.

Figure 14:
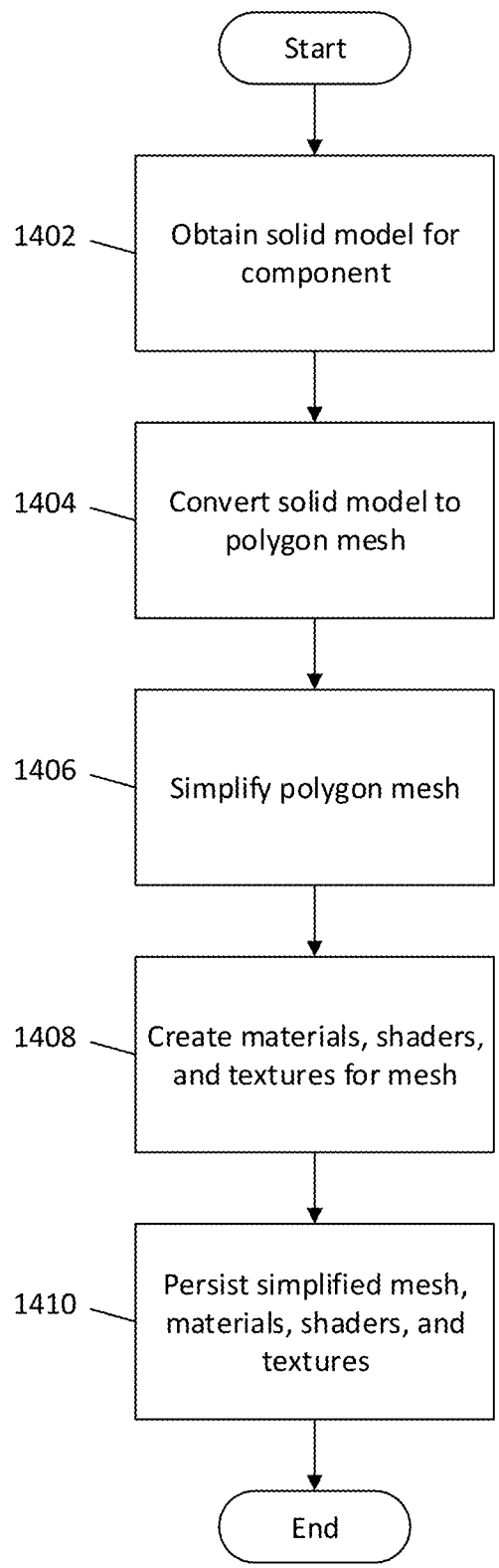
FIG. 14 is a flow diagram of a method for producing a 3D visualization of a rotorcraft component, in accordance with some embodiments.

FIG. 14 is a flow diagram of a method for producing a 3D visualization of a rotorcraft component, in accordance with some embodiments. The illustrated steps may be performed by the back-end fleet management servers 406B when a new component is added to the database 410.

The solid model for the component is obtained (step 1402). Obtaining the solid model includes obtaining the source CAD data for the component. For example, the CAD data for the component may be stored in and retrieved from the database 410, or may be exported from the engineering CAD documents for a rotorcraft 10.

The component's solid model is converted to a polygon mesh (step 1404). Converting the solid model may include exporting the solid model from the CAD system that the solid model is defined in. The exported polygon mesh may be in any format. In some embodiments, the exported polygon mesh is a STEP file, a 3DXML file, or the like.

The polygon mesh is simplified (step 1406). Simplifying the mesh reduces the quantity of polygons for the mesh. When an intricate component is initially converted from a solid model, the resulting polygon mesh may include many unnecessary or undesired vertices, edges, or faces. For example, a mesh for a screw may have many polygons corresponding to the screw threading. Although rendering the screw threading may be desired, the computing power needed to render such intricacies may not be feasible. Simplifying the mesh may include deleting these undesired vertices, edges, or faces of the mesh. Simplification may be performed by, e.g., decimating the mesh, dissolving the mesh, directly deleting undesired parts of the mesh, or the like.

Materials, shaders, and textures are created for the simplified polygon mesh (step 1408). The materials, shaders, and textures define how the polygon mesh looks when rendered. The materials for the mesh define how rendered light behaves when it hits the surface of the mesh. The textures define the colors of the materials, and may give the surface features such as bumps or wrinkles. The textures may be images, bump maps, normal maps, or the like. The shaders are sets of properties for the materials, such as translucency, reflectivity, and the like. The textures allow an approximation of details from the original mesh to be rendered when a simplified mesh is used. Continuing the above example, although the simplified polygon mesh for a screw may not include polygons for the screw threading, textures may be used to represent or simulate the threading. The textures may include an image of the threading, or may include a normal map that allows lighting details of the threading to be simulated.

The materials, shaders, and textures are created based on the design and manufacturing data for the component. The design and manufacturing data may be stored in the database 410, or stored in another (separate) database. In particular, the design and manufacturing data indicates what material the component is formed from and the color of that material. For example, the design and manufacturing data may indicate that a screw is formed from steel, is silver, and has a brushed finish. Such data may be used to generate materials, shaders, and textures that have similar properties.

After steps 1406 and 1408, the 3D visualization of the rotorcraft component includes the simplified polygon mesh, and the materials, shaders, and textures. The 3D visualization is persisted (step 1410). The persisting is performed by storing the 3D visualization in the entry of the component table 1004 for the rotorcraft component.

Figure 15:
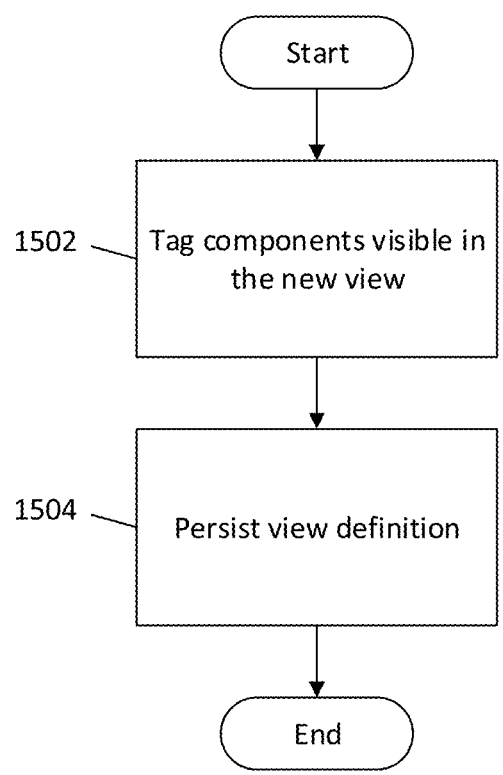
FIG. 15 is a flow diagram of a method for defining a rotorcraft view, in accordance with some embodiments.

FIG. 15 is a flow diagram of a method for defining a rotorcraft view, in accordance with some embodiments. The illustrated steps may be performed by the back-end fleet management servers 406B when defining views in a technical publication.

The components that should be visible in the view are tagged (step 1502). A view includes the desired components of interest, and may include nearby components for contextual viewing. The view may be defined with a unique identifier for the view definition, and each component tagged with the unique identifier. The view is then persisted (step 1504). The persisting is performed by storing the tags for each component in the tag table 1006. Each entry in the tag table refers to a component in the component table 1004. When rendering the view, all components that have a given tag number are rendered for the view. Each component in the component table 1004 has many tags in the tag table 1006. Thus, each component may be in multiple views.

Figure 16:
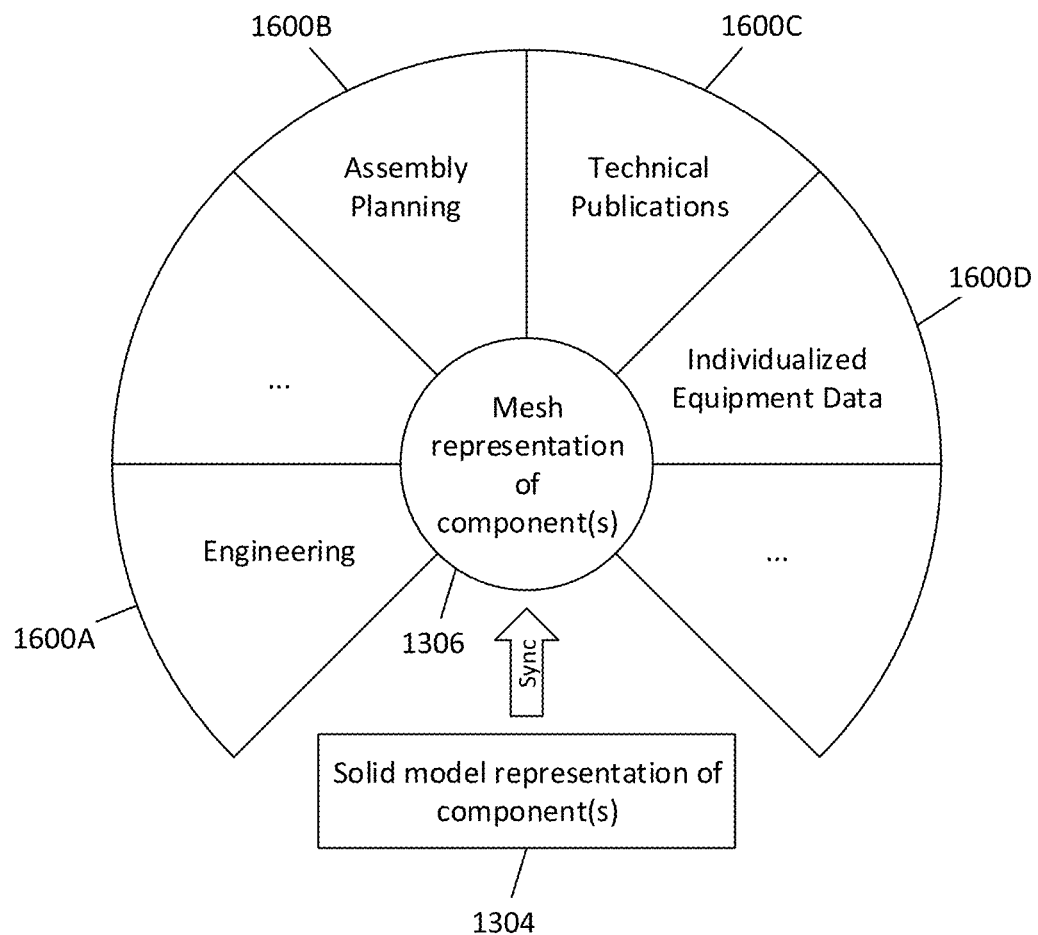
FIG. 16 is a diagram of an enterprise rotorcraft data system, in accordance with some embodiments.

FIG. 16 is a diagram of an enterprise rotorcraft data system, in accordance with some embodiments. In the enterprise rotorcraft data system, several enterprise groups 1600A-1600C access the database 410. In particular, the enterprise groups 1600A-1600C access the mesh representations 1306 of rotorcraft in the database 410. Each of the enterprise groups 1600A-1600C may store metadata with components of the rotorcraft in the database 410, such as by creating records in the tag table 1006 associated with the various components. In some embodiments, metadata created by one group is accessible by other groups. In some embodiments, metadata created by one group is inaccessible to other groups.

In some embodiments, views of the rotorcraft are defined by one enterprise group and used by another group. For example, the engineering group 1600A may define views for the rotorcraft. The views may then be used by the assembly planning group 1600B to produce manufacturing instructions for a rotorcraft. The manufacturing instructions are individualized to a specific rotorcraft, such as a specific configuration ordered by a customer. The manufacturing instructions are then used by the assembly planning group 1600B to manufacture a rotorcraft. Likewise, the views may be used by the technical publications group 1600C to produce maintenance instructions for the rotorcraft.

In some embodiments, metadata is shared across enterprise groups. For example, the engineering group 1600A may annotate views, such as by adding metadata to the tag table 1006. The annotations may be accepted or rejected in the documents produced by other enterprise groups.

The solid model representations 1304 of rotorcraft in the database 410 are inaccessible to the enterprise groups 1600A-1600C. The solid model representations 1304 are automatically converted to mesh representations 1306, such as by performing the method shown in FIG. 14. In some embodiments, changes are made in the solid model representations 1304, and those changes are automatically synchronized to produce new mesh representations 1306. For example, when a design change in the rotorcraft is made, the new design may be synchronized from the solid model representations 1304 to the mesh representations 1306. The views produced by the enterprise groups 1600A-1600C are then automatically updated with the new mesh representations 1306.

In some embodiments, documents are defined and used by the different enterprise groups 1600A-1600C. The documents may also be defined by tagging components in the database 410. The documents are produced by querying the database 410 and filtering the results to obtain the document. For example, the assembly planning group 1600B defines assembly planning publications with instructions for manufacturing the rotorcraft, and the technical publications group 1600C defines technical publications with instructions for maintaining the rotorcraft. The assembly planning publications comprise a first subset of the data in the database 410, and the technical publications comprise a second subset of the data in the database 410. In some embodiments, the individualized equipment data for each rotorcraft comprises a subset of the data in the database 410, and is obtained by querying the database 410 and filtering it to obtain data specific to a given rotorcraft.

In some embodiments, the documents have views that include multiple contextual layers. For example, a view in a technical publication may include an electrical layer and a hydraulics layer. The visible layers may be toggled when viewing the documents, e.g., using the remote terminal 402. The layers in each view may also be defined by tagging components in the database 410.

The fleet management system 500 (see FIG. 5) may be used to perform a variety of fleet tracking, data analysis, and preventative maintenance functions. In particular, the individualized equipment data for the fleet of rotorcraft may enable several functions. Each of these functions are described below.

Figure 17:
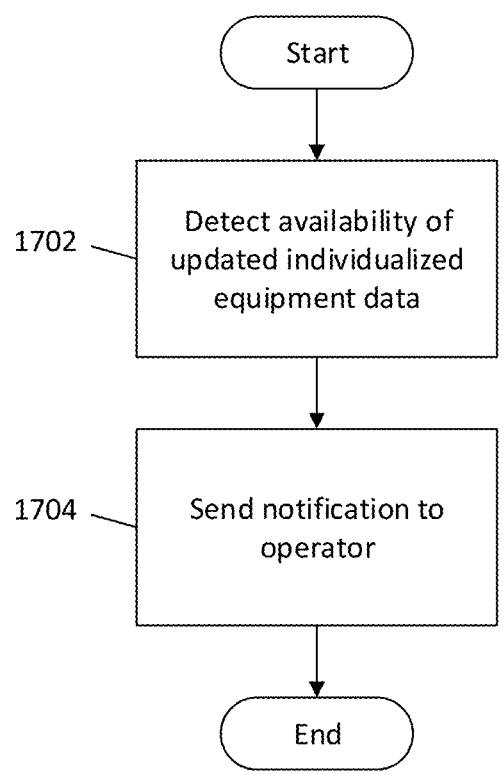
FIG. 17 is a flow diagram of a method for notifying operators of technical publication updates, in accordance with some embodiments.

FIG. 17 is a flow diagram of a method for notifying operators of technical publication updates, in accordance with some embodiments. The method is performed when updated individualized equipment data for a rotorcraft is available but has not yet been copied to the ECAMS 306 of the rotorcraft. Availability of the updated individualized equipment data is detected (step 1702). Detection may include tracking when a ECAMS 306 accesses its individualized equipment data, and determining no access has occurred since the last update. A notification is sent to an operator (step 1704). Sending the notification may include sending an email, push notification, voicemail, or the like to the operator. In some embodiments, the operator is a different entity than the manufacturer of the rotorcraft. For example, in FIG. 5, the back-end fleet management servers 406B are operated by the manufacturer of the rotorcraft, and a notification is sent to a user device operated by the customer of the rotorcraft, such as the front-end operator terminal 506A.

Figure 18:
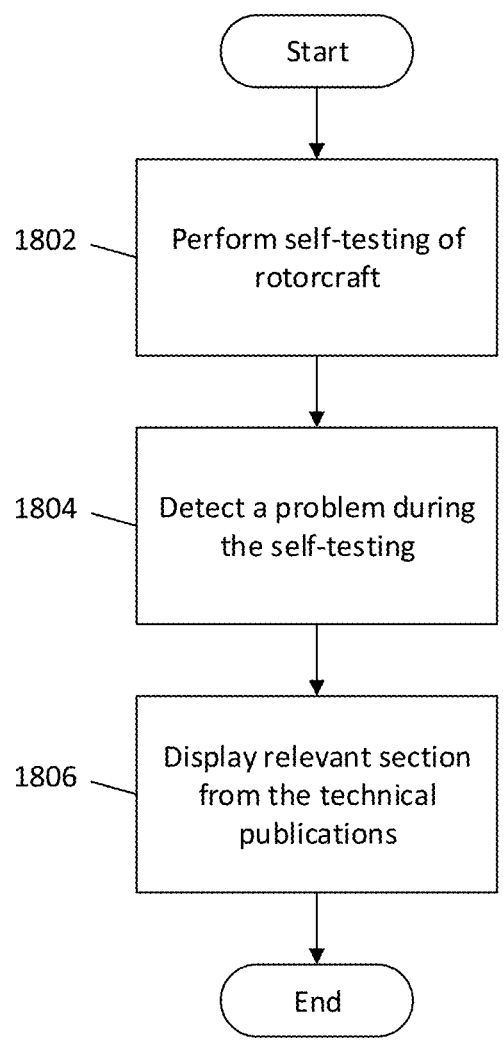
FIG. 18 is a flow diagram of a method for suggesting maintenance procedures for a rotorcraft, in accordance with some embodiments.

FIG. 18 is a flow diagram of a method for suggesting maintenance procedures for a rotorcraft, in accordance with some embodiments. The method is performed during self-testing of the rotorcraft 10 by the HUMS 304. The self-testing is performed (step 1802). The self-testing may be performed periodically, or when requested by maintenance crew. A problem may be detected during the self-test (step 1804). For example, the HUMS 304 tests different systems of the rotorcraft 10 and analyzes sensor feedback to determine whether those systems have any anomalies or potential issues that should be investigated. The HUMS 304 may notify the ECAMS 306 that one or more components failed self-test. A relevant section from the technical publications is displayed in response to determining failure of self-test (step 1806). The section of the technical publications may be selected by the ECAMS 306 based on the component(s) that failed self-test. For example, if the self-test indicates a potential problem with a wire, the technical publication selected for display may be a manual with instructions for accessing and replacing the wire. The section of the technical publications is displayed on a device operated by maintenance crew, such as the remote terminal 402 or front-end operator terminals 506A.

Figure 19:
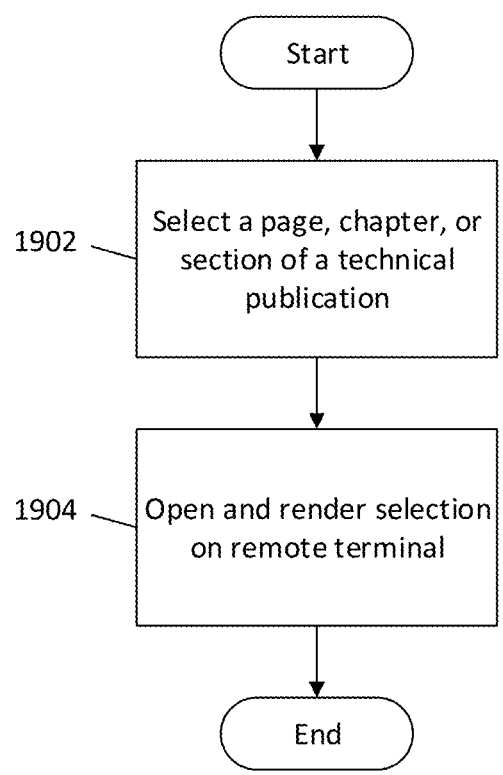
FIG. 19 is a flow diagram of a method for displaying technical publications for a rotorcraft, in accordance with some embodiments.

FIG. 19 is a flow diagram of a method for displaying technical publications for a rotorcraft, in accordance with some embodiments. The method is performed when an operator views the technical publications. As noted above, the technical publications are interactive documents that may include 3D views of the rotorcraft, and are individualized for the rotorcraft. The views are rendered on a viewing device, such as the remote terminal 402. A page, chapter, or section of a technical publication is selected (step 1902). The selection may be performed by a maintenance crew member. The selection is opened and rendered on the remote terminal 402 (step 1904). As noted above, the technical publication includes instructions (e.g., text) and views (e.g., images). The text for the selection is printed to the remote terminal 402. The views are rendered on the remote terminal 402. Rendering the views includes obtaining the definition for the view, and rendering a computer graphics image using the 3D visualizations from the individualized equipment data for the rotorcraft.

In some embodiments, the views are stationary images. In such embodiments, the images are rendered once and displayed on the remote terminal 402. In some embodiments, the views are videos. In such embodiments, the videos may be rendered using the 3D visualizations and played on the remote terminal 402. The videos may be, e.g., a kinematic simulation that visually illustrate steps for disassembling components, opening an access panel, and the like. Because the images and videos are rendered using the 3D visualizations, they are individualized for the rotorcraft. Contextual information in the images and videos will thus be displayed as expected in the fielded rotorcraft.

In some embodiments, the remote terminal 402 is a wearable device such as a pair of smart glasses. In such embodiments, the views may be rendered as holographic overlays on the smart glasses. The holographic overlays may be aligned with the rotorcraft, to create an augmented reality experience for the operator. The holographic overlays are rendered using the 3D visualizations and are individualized for the rotorcraft.

Figure 20:
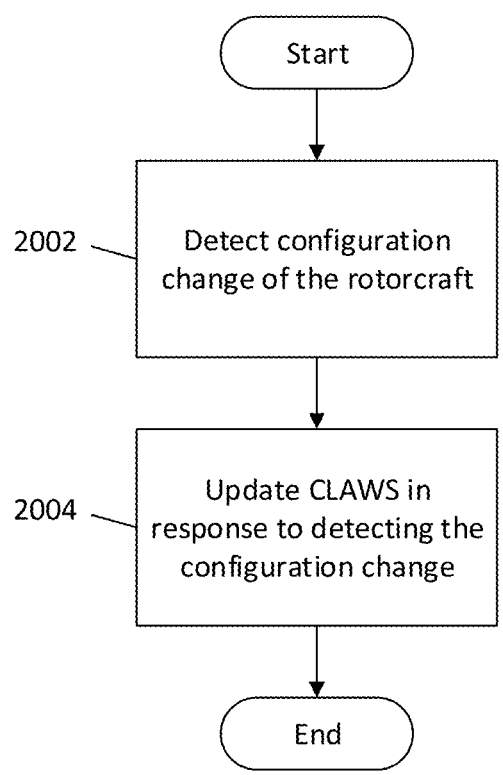
FIG. 20 is a flow diagram of a method for controlling flight of a rotorcraft, in accordance with some embodiments.

FIG. 20 is a flow diagram of a method for controlling flight of a rotorcraft, in accordance with some embodiments. The method is performed when the individualized equipment data for the rotorcraft is updated. A configuration change of the rotorcraft is detect (step 2002). The configuration change may be detected by the ECAMS 306 in response to receiving updated individualized equipment data for the rotorcraft. In some embodiments, the change in configuration may be detected based on the presence or absence of components that affect handling of the rotorcraft. The CLAWS executed by the flight control system 302 are updated in response to the configuration change (step 2004). For example, discharging of armaments may affect handling of the rotorcraft. When the updated individualized equipment data indicates installation of armaments in the rotorcraft, the control loop filters of the CLAWS may be updated to counteract recoil of the armaments during flight.

Figure 21:
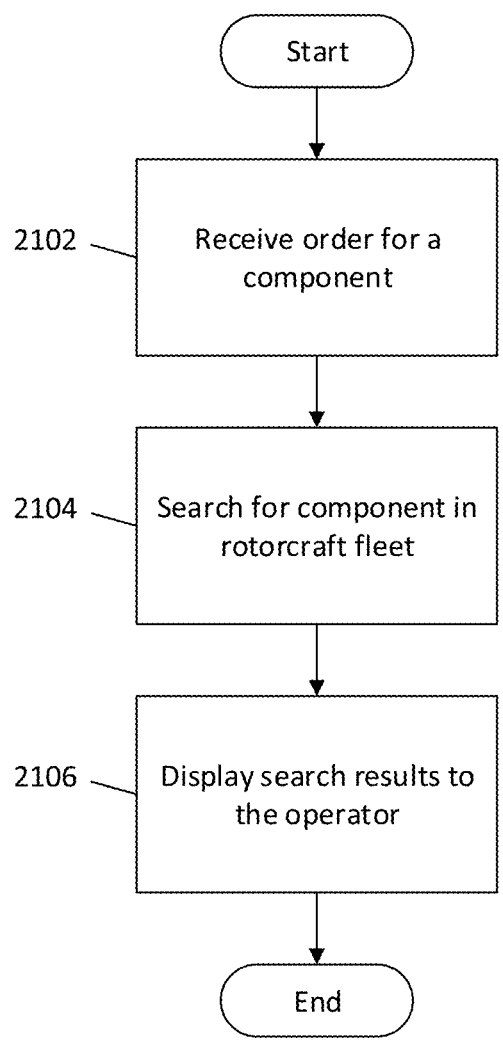
FIG. 21 is a flow diagram of a method for repairing a rotorcraft, in accordance with some embodiments.

FIG. 21 is a flow diagram of a method for repairing a rotorcraft, in accordance with some embodiments. The method is performed by an operator when searching for components to install in a rotorcraft. An order for a component is received (step 2102). The order may be received at a terminal such as the remote terminal 402 or front-end operator terminals 506A. The order indicates a type of part the operator is seeking. For example, the order may indicate the operator is seeking a tail rotor blade. The component is searched for in the fleet (step 2014). Searching for the component includes searching the individualized equipment data of each rotorcraft in the fleet for a matching replacement. The search results are displayed to the operator (step 2106). Continuing the above example, the search may indicate a nearby inoperable rotorcraft has a matching tail rotor blade.

Figure 22:
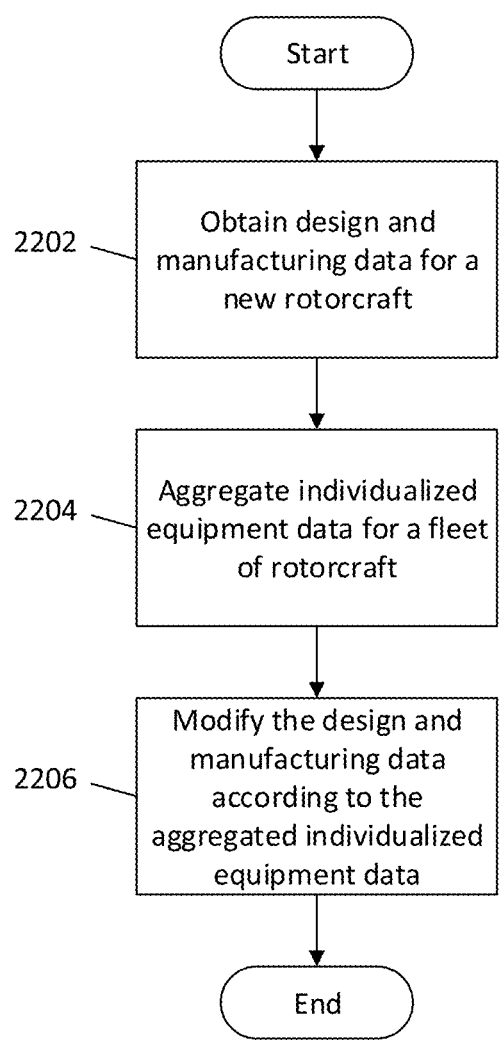
FIG. 22 is a flow diagram of a method for designing a rotorcraft, in accordance with some embodiments.

FIG. 22 is a flow diagram of a method for designing a rotorcraft, in accordance with some embodiments. The method is performed to modify the design and manufacturing data for the rotorcraft. In particular, the design and manufacturing data may be modified by an entity such as the manufacturer of the rotorcraft. Modifying the design and manufacturing data allows the manufacture of future rotorcraft to be informed by the usage and maintenance history of existing rotorcraft in a fleet.

Design and manufacturing data for the new rotorcraft is obtained (step 2202). The design and manufacturing data may be stored in another location, and may be defined for a family of rotorcraft. In embodiments where the back-end fleet management servers 406B are separated from the front-end fleet management servers 406A, the design and manufacturing data may be stored in a location that is only accessible to the back-end fleet management servers 406B, such as in another database.

The individualized equipment data for the rotorcraft in the fleet is aggregated (step 2204). In accordance with some embodiments, the individualized equipment data for multiple rotorcraft is analyzed to inform changes of the design and manufacturing data. In some embodiments, the individualized equipment data from multiple fleets is aggregated, and cross-fleet analysis is performed.

The design and manufacturing data is modified according to the usage and maintenance history from the aggregated individualized equipment data (step 2206). The design and manufacturing data is statistically analyzed to determine the failure rates of components and identify components with abnormally high failure rates. Analysis may be performed by one or more machine learning methods such as deep learning with the data. When components with abnormally high failure rates are identified, those components may be indicated to an operator. For example, the components with abnormally high failure rates may be displayed on a back-end operator terminal 506B. The operate may then modify the design and manufacturing data (e.g., the CAD, ECAM, or CAE source files) for the rotorcraft, replacing the undesired components with different components.

Figure 23:
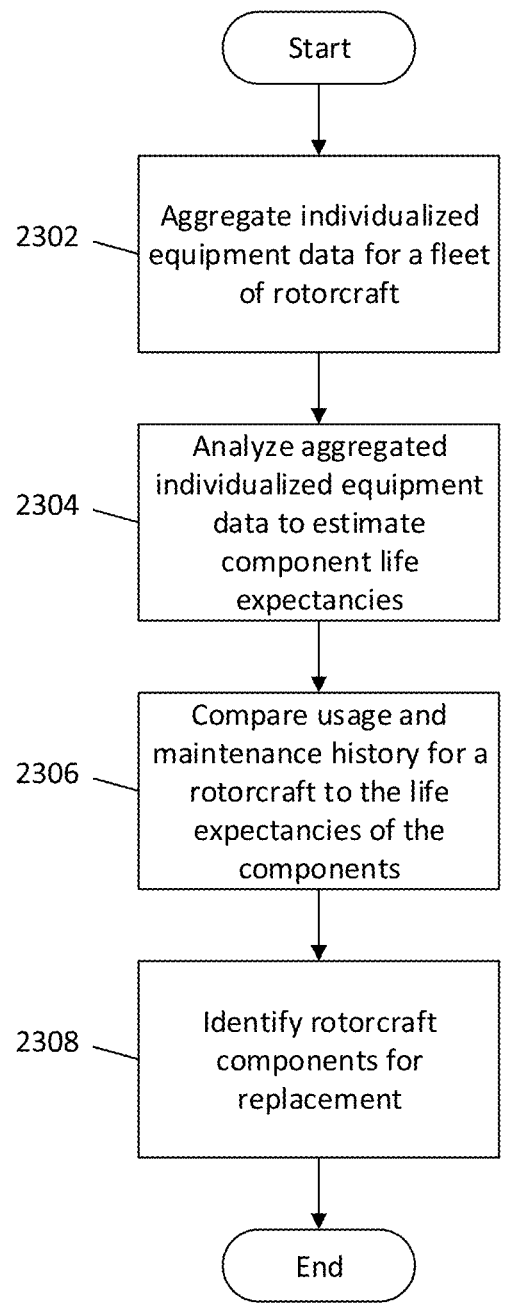
FIG. 23 is a flow diagram of a method for repairing a rotorcraft, in accordance with some embodiments.

FIG. 23 is a flow diagram of a method for repairing a rotorcraft, in accordance with some embodiments. The method is performed to predict failures of components of the rotorcraft. Predicting component failures allows the operator of the rotorcraft to perform preventative maintenance that is informed by the usage and maintenance history of the rotorcraft in a fleet.

The individualized equipment data for the rotorcraft in the fleet is aggregated (step 2302). In accordance with some embodiments, the individualized equipment data for multiple rotorcraft is analyzed to predict failures of rotorcraft components. In some embodiments, the individualized equipment data from multiple fleets is aggregated, and cross-fleet analysis is performed.

The aggregated individualized equipment data is statistically analyzed to estimate the life expectancies of components (step 2304). Analysis may be performed by one or more machine learning methods such as deep learning with the usage and maintenance history data. For example, the aggregated individualized equipment data may be analyzed to determine the mean time between failure (MTBF) for a given component, such as a rotor blade.

The usage and maintenance history for a given rotorcraft is compared to the life expectancies of the components (step 2306). The usage and maintenance history for the rotorcraft is evaluated to determine the time-on-wing for each component of the given rotorcraft. Components are identified for preemptive replacement based on their estimated life expectancies and their time-on-wing (step 2308). In some embodiments, components having a time-on-wing greater than their estimated life expectancy are identified as likely to fail. In some embodiments, supply chain data for the components is analyzed to determine the lead time for obtaining replacement components. For example, the average order lead time for a given component may be determined. If the sum of the component's time-on-wing and order lead time is greater than the estimated life expectancy, the component is identified for preemptive replacement. The components that are identified for preemptive replacement are indicated to an operator. For example such components may be displayed on a back-end operator terminal 506B. The operator may then replace those components for the rotorcraft.

Figure 24:
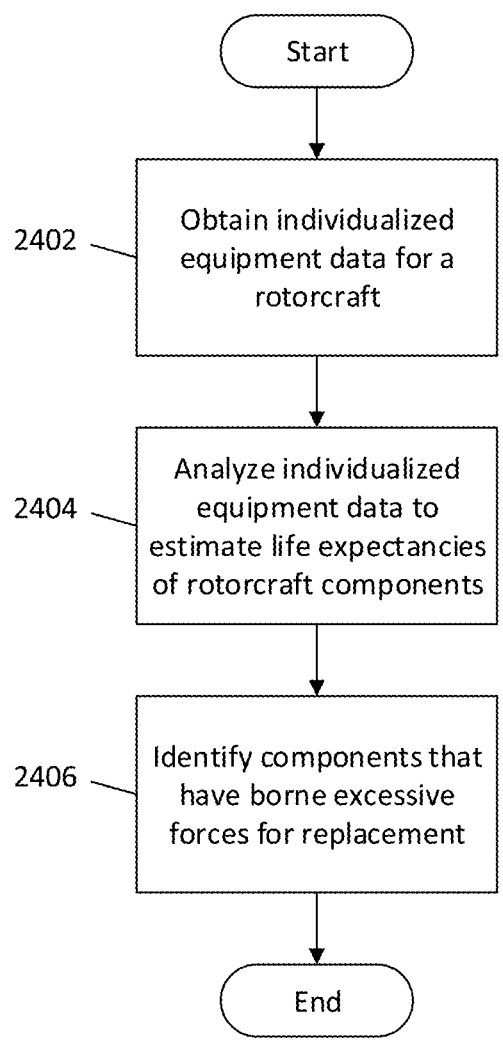
FIG. 24 is a flow diagram of a method for repairing a rotorcraft, in accordance with some embodiments.

FIG. 24 is a flow diagram of a method for repairing a rotorcraft, in accordance with some embodiments. The method is performed to predict failures of components of the rotorcraft. Predicting component failures allows the operator of the rotorcraft to perform preventative maintenance that is informed by the usage and maintenance history of the rotorcraft.

The individualized equipment data for the rotorcraft is obtained (step 2402). The individualized equipment data is analyzed to estimate the life expectancies of components (step 2404). Analysis may be performed by one or more numerical methods such as a finite element analysis with the usage history data of the rotorcraft. Sensor data from the HUMS 304 is analyzed to determine the forces that the components of the rotorcraft have been subjected to during operation. Components that have borne excessive forces are identified for preemptive replacement (step 2406). A component is identified as having borne excessive forces in response to the computed forces exceeding a predetermined threshold for (e.g., specific to) the component. The components that are identified for preemptive replacement are indicated to an operator. For example such components may be displayed on a back-end operator terminal 506B. The operator may then replace those components for the rotorcraft.

Embodiments may achieve advantages. By including the individualized equipment data for the rotorcraft 10 on the ECAMS 306, the individualized equipment data may follow the rotorcraft 10 and may be accessed regardless of whether a given remote terminal 402 is available. Because the individualized equipment data includes 3D visualizations for the rotorcraft 10, technical documents for the rotorcraft 10 with interactive views or kinematic simulations may be displayed to an operator or maintenance crew. By converting solid models of the rotorcraft to simplified mesh-based 3D visualizations, the individualized equipment data may be more easily viewed on the remote terminals 402. In particular, the remote terminals 402 may not have sufficient processing power to render views with solid models, but may have sufficient power to render views with simplified mesh-based 3D visualizations.

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
   collecting usage and maintenance data for a rotorcraft at a computer of the rotorcraft;
   sending the usage and maintenance data to a fleet management server;
   generating individualized equipment data for the rotorcraft according to the usage and maintenance data at the fleet management server, the individualized equipment data comprising a lightweight digital representation of the rotorcraft and technical publications for the rotorcraft, the lightweight digital representation comprising mesh-based 3D visualizations of each component of the rotorcraft, the technical publications having views referencing the mesh-based 3D visualizations, wherein generating the individualized equipment data for the rotorcraft comprises:
      obtaining the individualized equipment data for the rotorcraft from a database;
      updating the lightweight digital representation of the rotorcraft according to the usage and maintenance data for the rotorcraft; and
      updating the technical publications for the rotorcraft according to the updated lightweight digital representation;
   sending the individualized equipment data to the computer of the rotorcraft; and
   persisting the individualized equipment data at the computer of the rotorcraft.

2. The method of claim 1, wherein sending the usage and maintenance data to the fleet management server comprises:
   sending the usage and maintenance data from the computer of the rotorcraft to a front-end fleet management server, the front-end fleet management server being located in a same network as the computer of the rotorcraft; and
   forwarding the usage and maintenance data to a back-end fleet management server, the back-end fleet management server being located in a different network than the computer of the rotorcraft.

3. The method of claim 2, wherein sending the individualized equipment data to the computer of the rotorcraft comprises:
   sending the individualized equipment data from the back-end fleet management server to the front-end fleet management server; and
   forwarding the individualized equipment data to the computer of the rotorcraft.

4. The method of claim 1, wherein the usage and maintenance data comprises recent usage and maintenance data for the rotorcraft, wherein the lightweight digital representation of the rotorcraft further comprises usage and maintenance history of the rotorcraft, and a bill of materials for the rotorcraft, and wherein updating the lightweight digital representation of the rotorcraft comprises:
   updating the usage and maintenance history of the rotorcraft according to the recent usage and maintenance data for the rotorcraft;
   updating the bill of materials for the rotorcraft according to the updated usage and maintenance history; and
   generating the mesh-based 3D visualizations according to the updated bill of materials.

5. The method of claim 4, wherein generating the mesh-based 3D visualizations comprises:
   accessing a solid model of each respective component of the rotorcraft;
   converting the solid model of each respective component to a polygon mesh;
   simplifying the polygon mesh of each respective component to reduce a quantity of polygons in the polygon mesh; and creating materials, shaders, and textures for the polygon mesh of each respective component according to design and manufacturing data for the respective component.

6. The method of claim 1, wherein the technical publications for the rotorcraft further comprise instructions, and wherein updating the technical publications for the rotorcraft comprises:
generating the instructions for the technical publications; and
rendering the views for the technical publications.

7. The method of claim 1 further comprising:
defining the views of the technical publications by tagging each component of the rotorcraft with metadata stored in the database.

8. The method of claim 1 further comprising:
after generating the individualized equipment data, sending a notification to an operating terminal, the notification indicating that updated individualized equipment data for the rotorcraft is available; and
receiving a request from the operating terminal, the individualized equipment data being sent to the computer of the rotorcraft in response to receiving the request.

9. The method of claim 1, wherein the rotorcraft is one of a fleet of rotorcraft, and further comprising:
aggregating usage and maintenance data for the fleet of rotorcraft;
estimating a life expectancy of each component of the rotorcraft according to the aggregated usage and maintenance data for the fleet of rotorcraft; and
identifying a component of the rotorcraft for replacement according to the life expectancy of the component.

10. The method of claim 1 further comprising:
analyze the usage and maintenance data with a numerical method to determine forces that each component has been subjected to during flight; and
identifying a component of the rotorcraft for preemptive replacement in response to the forces of the component exceeding a predetermined threshold for the component.

11. A rotorcraft computer comprising:
a processor; and
a non-transitory computer readable storage medium storing programming for execution by the processor, the programming comprising instructions for:
collecting usage and maintenance data for a rotorcraft from a health and usage monitoring system (HUMS) of the rotorcraft;
sending the usage and maintenance data to a fleet management server;
receiving individualized equipment data for the rotorcraft from the fleet management server, the individualized equipment data comprising a lightweight digital representation of the rotorcraft and technical publications for the rotorcraft, the lightweight digital representation comprising mesh-based 3D visualizations of each component of the rotorcraft, the technical publications having views referencing the mesh-based 3D visualizations; and
displaying the technical publications on a remote terminal, wherein the remote terminal is a wearable device, and wherein displaying the technical publications comprises:
rendering a holographic overlay with the mesh-based 3D visualizations; and
displaying the holographic overlay on the wearable device.

12. The rotorcraft computer of claim 11, wherein the views of the technical publications have a plurality of layers, and wherein the instructions for displaying the technical publications comprise instructions for:
filtering the views of the technical publications to one of the plurality of layers.

13. The rotorcraft computer of claim 11, wherein the instructions for collecting the usage and maintenance data comprise instructions for:
obtaining maintenance records for the rotorcraft from the remote terminal.

14. The rotorcraft computer of claim 11, wherein the instructions for collecting the usage and maintenance data comprise instructions for:
obtaining health and usage data from a health and usage monitoring system (HUMS) of the rotorcraft.

15. The rotorcraft computer of claim 14, wherein the programming further comprises instructions for:
performing a self-test of the rotorcraft with the HUMS;
detecting an anomaly of the rotorcraft during the self-test;
selecting a section of the technical publications corresponding to the anomaly of the rotorcraft; and
displaying the selected section of the technical publications on the remote terminal.

16. The rotorcraft computer of claim 11, wherein the lightweight digital representation comprises a bill of materials for the rotorcraft, and wherein the programming further comprises instructions for:
updating control laws (CLAWS) executed by a flight control system of the rotorcraft according to the bill of materials of the rotorcraft.

17. The rotorcraft computer of claim 11, wherein the instructions for displaying the technical publications comprises instructions for:
rendering a computer graphics image using the mesh-based 3D visualizations from the individualized equipment data for the rotorcraft, the computer graphics image being a kinematic simulation of a process from the technical publications.

18. A server comprising:
a processor; and
a non-transitory computer readable storage medium storing programming for execution by the processor, the programming comprising instructions for:
receiving usage and maintenance data for a rotorcraft from a computer of the rotorcraft;
obtaining individualized equipment data for the rotorcraft from a database, the individualized equipment data comprising a lightweight digital representation of the rotorcraft and technical publications for the rotorcraft, the lightweight digital representation comprising mesh-based 3D visualizations of each component of the rotorcraft, the technical publications having views referencing the mesh-based 3D visualizations;
updating the lightweight digital representation of the rotorcraft according to the usage and maintenance data;
updating the technical publications for the rotorcraft according to the updated lightweight digital representation;
persisting the updated individualized equipment data in the database; and
sending the updated individualized equipment data to the computer of the rotorcraft.

19. The server of claim 18, wherein the rotorcraft is one of a fleet of rotorcraft, and wherein the programming further comprises instructions for:
- aggregating usage and maintenance data for the fleet of rotorcraft;
- estimating a life expectancy of each component of the rotorcraft according to the aggregated usage and maintenance data for the fleet of rotorcraft; and
- identifying a component of the rotorcraft for replacement according to the life expectancy of the component.

20. The server of claim 18, wherein the programming further comprises instructions for:
- analyze the usage and maintenance data with a numerical method to determine forces that each component has been subjected to during flight; and
- identifying a component of the rotorcraft for preemptive replacement in response to the forces of the component exceeding a predetermined threshold for the component.

* * * * *